United States Patent [19]

Fuller et al.

[11] Patent Number: 5,490,199
[45] Date of Patent: Feb. 6, 1996

[54] NON-INTRUSIVE NETWORK-BASED ANALYSIS OF FACSIMILE TRANSMISSIONS

[75] Inventors: Richard C. Fuller, Fair Haven; Thomas W. Goeddel, Fair Haven; R. B. Heick, Red Bank; Martin Herzlinger, Freehold; Subramanian Krishnamurthy, Middletown, all of N.J.

[73] Assignee: AT&T Corp., Murray Hill, N.J.

[21] Appl. No.: 839,972

[22] Filed: Feb. 21, 1992

[51] Int. Cl.⁶ .......................... H04M 11/00; H04M 1/24
[52] U.S. Cl. .................. 379/1; 379/34; 379/93; 379/100; 379/406
[58] Field of Search .................. 379/9, 10, 28, 379/100, 93; 381/406; 358/434, 435, 436, 437, 438, 439, 406; 370/20.1; 375/8, 10

[56] References Cited

U.S. PATENT DOCUMENTS

| | | | |
|---|---|---|---|
| 4,532,554 | 6/1985 | Skala | 358/434 |
| 4,815,136 | 3/1989 | Benvenuto | 381/43 |
| 4,815,137 | 3/1989 | Benvenuto . | |
| 4,951,156 | 8/1990 | Kotani et al. . | |
| 4,965,676 | 10/1990 | Ejiri et al. . | |
| 4,979,211 | 12/1990 | Benvenuto et al. . | |
| 5,041,917 | 8/1991 | Koshiishi | 358/438 X |
| 5,117,453 | 5/1992 | Piasecki et al. | 379/100 |
| 5,193,110 | 5/1993 | Jones et al. | 379/100 |
| 5,216,519 | 6/1993 | Daggett et al. | 358/436 X |
| 5,299,257 | 3/1994 | Fuller et al. | 379/342 |

FOREIGN PATENT DOCUMENTS

| | | | |
|---|---|---|---|
| 2169492 | 2/1992 | Japan | 379/100 |
| 2321534 | 7/1992 | Japan | 374/100 |
| 2326230 | 7/1992 | Japan | 379/100 |

OTHER PUBLICATIONS

Hewlett Packard Journal (In–Service Transmission Impairment Testing of Voice–Frequency Data Circuits), N. Carder et al. Oct. 1987, pp. 4–15.

Phamphlet entitled "Fax Call Analyser" by Rotadata Telecommunication Products, 11584 Goldcoast Drive, Blue Ash, Cincinnati, Ohio 45249.
Application Note For the FAX G3 Tester, "Procedures For The Operation Of The Tester And Communication Sequence Analysis", pp. 1–22.
"Test Results Sheet for AE–3107B FAX G3 Tester, No. 70146208," Ando Electric Co., Ltd., Tokyo, Japan, pp. 1–2.
"AS–84212–1 Instruction Manual For AE–3107B FAX G3 Tester," Ando Electric Co., Ltd., Tokyo, Japan, pp. 1-1-3-13.

*Primary Examiner*—Stephen Chin
*Assistant Examiner*—Paul Loomis
*Attorney, Agent, or Firm*—Eugene S. Indyk; Mark K. Young

[57] ABSTRACT

Non-intrusive monitoring and analysis of real-time facsimile transmissions is accomplished. Analog impairment measurements are made on the high speed page signal in those transmissions and protocol analysis is made on the low speed control messages in those transmissions. These measurements and analysis are a powerful tool for trouble shooting service problems afflicting facsimile transmissions. Real customer traffic can be monitored to detect circuit impairments and to evaluate service being provided. A selected incoming trunk of a central office switch is accessed and a monitoring function with respect to that trunk is established. A signal classification operation is performed, which identifies the presence of a facsimile transmission and what kind of facsimile transmission it is. When the classification operation has determined the presence and nature of a facsimile transmission, a series of non-intrusive impairment measurements is made using the page information sent in the course of the facsimile transmission. Analog transmission impairments are identified along with signal to noise performance. Echo and delay measurements are also taken and the protocols are tracked. The measurement data is collected and analyzed to ascertain whether or not the facsimile transmission was normal. A diagnostic module uses the measurements to determine why any given transmission was abnormal.

50 Claims, 20 Drawing Sheets

(a) −18 dB THRESHOLD
(b) −12 dB THRESHOLD
(c) −7 dB THRESHOLD

FIG. 17

FAXALYZER

*RETRIEVAL: COUNTRY LIST*

(COUNTRY ▽) (TRUNK SUBGROUP ▽) (TRUNK/C-FWD ▽) (SESSION ▽) (CALL ▽) (EVENT ▽) (QUIT)

USA  ANY TOWN  XXXXXXXX  SESS. N:---  CALL N:---  EVENT N:---

| COUNTRY | OFFICE | CLLI |
|---|---|---|
| USA | ANYTOWN | XXXXX |
| GERMANY | FRANKFURT | XXXXXX |
| GERMANY | MUNICH | XXXXXX |
| INDIA | BOMBAY | XXXXX |
| INDIA | MADRAS | XXXXXX |
| INDIA | NEW DELHI | XXXXXX |
| ISRAEL | TEL AVIV | XXXXXX |
| SPAIN | MADRID | XXXXXXX |
| SPAIN | SANTA CRUZ | XXXXXXX |
| SWEDEN | GOTTENBERG | XXXXXXXX |
| SWEDEN | STOCKHOLM | XXXXXXXX |
| FRANCE | PARIS | XXXXXX |

FIG. 18

FAXALYZER

*RETRIEVAL : TRUNK ID /C-FWD ID LIST*

| COUNTRY ▽ | TRUNK SUBGROUP ▽ | TRUNK/C-FWD ▽ | SESSION ▽ | CALL ▽ | EVENT ▽ | QUIT |
| USA | ANY TOWN | 2701 XXXXXXXX | XXXXXXXX SESS. #:-- | CALL #:-- | EVENT #:-- | |

| BASE TFN | TFN | CLI | # SESSIONS |
|---|---|---|---|
| 2701 | 2701 | XXXXX | 2 |
| 2701 | 2701 | XXXXXXX | 2 |
| 2701 | 2702 | XXXXXXX | 0 |
| 2701 | 2703 | XXXXXXX | 0 |
| 2701 | 2704 | XXXXXXX | 0 |
| 2701 | 2705 | XXXXXXXX | 0 |
| 2701 | 2706 | XXXXXXXX | 0 |
| 2701 | 2707 | XXXXXXXX | 0 |
| 2701 | 2708 | XXXXXXXX | 0 |
| 2701 | 2709 | XXXXXXXX | 0 |
| 2701 | 2710 | XXXXXXXX | 0 |
| 2701 | 2711 | XXXXXXXX | 0 |
| 2701 | 2712 | XXXXXX | 0 |

FIG. 20

SESSION SUMMARY

START TIME: 02/10/92 21:45:1　　　　# OF CALLS: 1　　　　　　　　　　　　　　　　　　　　　　　　　NON-STD CALLS (%): 0.00
STOP TIME: 02/10/92 21:46:5　　　　FAX: VOICE: OTHER (%): 100.00: 0.00: 0.00:　　　　CALLS ORIG IN US (%): 100.00
ECM CALLS (%): 0.00　　　　　　　　ECM CALLS W/RETRAINS REF 1ST PG (%): 0.00　　　　CALLS W/INV OF DIR (%): 0.00
CALL W/AUTO ORIG TONE (%): 100.00　CALLS W/RETRAINS BEF 1ST PG (%): 100.00　　　　　# PGS/FAX CALL: 2.00
CALLS W/AUTO ANSWER TONE (%): 100.00　CALLS W/RETRAINS AFT 1ST PG (%): 100.00

|  | GOOD | MARGINAL | BAD |
|---|---|---|---|
| OVERALL DIAGNOSIS STATUS (%): | 0.00 | 0.00 | 100.00 |
| IMAGE SIGNAL STATUS (%): | 0.00 | 0.00 | 100.00 |
| IMAGE PROTOCOL STATUS (%): | 0.00 | 0.00 | 100.00 |
| PROCESS PROTOCOL STATUS (%): | 0.00 | 100.00 | 0.00 |
| TERMINATION STATUS (%): | 100.00 | 0.00 | 0.00 |

|  | 9600 bps | 7200 bps | 4800 bps | 2400 bps | UNKNOWN |
|---|---|---|---|---|---|
| # OF PAGES AT (%): | 0.00 | 50.00 | 50.00 | 0.00 | 0.00 |
| AVG DUR OF PGS (SECS): | 0.00 | 20.00 | 21.00 | 0.00 | 0.00 |
| CALLS W/1ST TCF AT (%): | 100.00 | 0.00 | 0.00 | 0.00 | 0.00 |
| CALLS W/1ST PAGE AT (%): | 0.00 | 100.00 | 0.00 | 0.00 | 0.00 |

QUIT 91　　　1　　　1　　　0　　　1　　　0

FIG. 21

FAXALYZER

*RETRIEVAL : CALLS LIST*

( COUNTRY ▽ ) ( TRUNK SUBGROUP ▽ ) ( TRUNK/C-FWD ▽ ) ( SESSION ▽ ) ( CALL ▽ ) ( EVENT ▽ ) ( QUIT )

USA  ANY TOWN  2701  XXXXXXXX  SESS. #: 1  CALL #: --  EVENT #: --

| START TIME | CALL # | #EVENTS | TYPE | DUR. (SECS) | IMG-SIG | IMG-PROT | PROC-PROT | TERMINA |
|---|---|---|---|---|---|---|---|---|
| 12/22/90 00:59:57 | 4 | 73 | FAX | 405 | RED | | | |
| 12/22/90 01:24:17 | 11 | 59 | FAX | 160 | | | YELLOW | |
| 12/22/90 02:04:51 | 22 | 85 | FAX | 139 | RED | | | |
| 12/22/90 04:25:43 | 56 | 43 | FAX | 54 | | RED | | |
| 12/22/90 08:30:20 | 96 | 41 | FAX | 55 | RED | | | |
| 12/22/90 18:42:09 | 242 | 79 | FAX | 269 | | | YELLOW | |
| 12/23/90 04:46:07 | 377 | 34 | FAX | 40 | | | | |
| 12/24/90 15:05:20 | 782 | 35 | FAX | 53 | | | | |
| 12/25/90 02:46:27 | 974 | 53 | FAX | 27 | | | | |
| 12/25/90 03:37:15 | 999 | 63 | FAX | 269 | YELLOW | | | |
| 12/26/90 02:05:25 | 1229 | 16 | FAX | 8 | | | RED | |
| 12/26/90 06:04:51 | 1282 | 46 | FAX | 50 | | | YELLOW | |

FIG. 22

CALL SUMMARY

SESSION ID: 91
ORIG DIR: IN
NON-STD: NO
AUTO ORIG TONE: YES
AUTO ANS TONE: YES

CALL ID: 0
START TIME: 02/10/92 21:45:1
RECEIVER MNF:
RETRAIN BEF 1ST PG: YES
RETRAIN AFT 1ST PG: YES

CALL TYPE: FAX
DURATION (SECS) 98
EXM: NO
FLIP OF DIR: NO

OVERALL DIAGNOSIS STATUS:  X  BAD
IMAGE SIGNAL STATUS:       X  BAD
IMAGE PROTOCOL STATUS:     X  BAD
PROCESS PROTOCOL STATUS:   X  MARGINAL
TERMINATION STATUS:        X  GOOD

|  | 9600 bps | 7200 bps | 4800 bps | 2400 bps | UNKNOWN |
|---|---|---|---|---|---|
| # OF PAGES AT: | 0 | 1 | 1 | 0 | 0 |
| AVG DUR OF PGS (SECS): | 0.00 | 20.00 | 21.00 | 0.00 | 0.00 |
| TOT DUR OF RETRANS (SECS): | 0 | 0 | 0 | 0 | 0 |
| SPEED OF 1ST TCF: | X | | | | |
| SPEED OF 1ST PAGE: | | X | | | |

( QUIT )

| 0 | 113 | FAX | 98 | RED | 4800 bps | RED | 2400 bps | YELLOW |

FIG. 23

*RETRIEVAL : EVENTS LIST*

| COUNTRY ▽ | TRUNK SUBGROUP ▽ | TRUNK/C-FWD ▽ | SESSION ▽ | CALL ▽ | EVENT ▽ | QUIT |

USA  ANY TOWN  101 XXXXXXXXX  XX  CALL #: 0  EVENT #:--

EVENTS DATED: 02/10/92   INCOMING   OUTGOING   *SHOWING FAX EVENTS*

| # | Time | Event |
|---|------|-------|
| 25 | 21:45:36.6511 | V.21 HDLC -17.20 dBm CSI DIS OK |
| 28 | 21:45:38.8997 | V.21 HDLC -19.18 dBm 9600 bps DCS OK |
| 29 | 21:45:40.2396 | V.29 9600 bps -19.31 dBm ISQM TCF, SNR |
| 32 | 21:45:45.1200 | V.21 HDLC -19.24 dBm 9600 bps DCS CMD REPEAT |
| 34 | 21:45:46.4594 | V.29 9600 bps -19.30 dBm ISQM TCF, >1 BAD |
| 38 | 21:45:48.5774 | V.21 HDLC -17.18 dBm FTT BAD TCF |
| 41 | 21:45:50.1242 | V.21 HDLC -19.23 dBm 7200 bps DCS OK |
| 44 | 21:45:51.4590 | V.29 7200 bps -19.33 dBm ISQM TCF, >1 MARG |
| 47 | 21:45:53.5774 | V.21 HDLC -17.23 dBm CFR OK |
| 50 | 21:45:54.9431 | V.29 7200 bps -19.31 dBm ISQM PAGE, SNR |
| 55 | 21:46:15.2789 | V.21 HDLC -19.22 dBm MPS OK |
| 60 | 21:46:19.3679 | V.21 HDLC -19.15 dBm MPS CMD REPEAT |
| 69 | 21:46:20.7976 | V.21 HDLC -17.42 dBm RTN BAD PAGE |
| 74 | 21:46:22.1414 | V.21 HDLC -19.27 dBm 4800 bps DCS RETRAIN |
| 75 | 21:46:23.4810 | V.27 ter 4800 bps -19.18 dBm ISQM TCF, SNR |
| 81 | 21:46:26.2924 | V.21 HDLC -17.17 dBm CFR OK |
| 83 | 21:46:27.6345 | V.27 ter 4800 -19.31 dBm ISQM PAGE, SNR |
| 84 | 21:46:48.5919 | V.21 HDLC -19.12 dBm EOP OK |
| 100 | 21:46:52.8705 | V.21 HDLC -19.10 dBm EOP CMD REPEAT |
| 104 | 21:46:54.1778 | V.21 HDLC -17.22 dBm MCF OK |
| 108 | 21:46:55.4794 | V.21 HDLC -19.24 dBm DCN OK |

FIG. 24

|  | JITTER | MOD (4-20 Hz) | MOD (20-300 Hz) |
|---|---|---|---|
| AMPLITUDE (%) | 5.06 | 0.02 | 0.19 |
| PHASE (DEG) | 5.67 | 0.05 | 0.17 |

| FREQ (Hz) | ATTEN DIST (dB) | EDD (MICROSECS) |
|---|---|---|
| 404 | | |
| 504 | | |
| 604 | -0.25 | 323.00 |
| 804 | 1.06 | 183.00 |
| 1004 | 0.68 | 71.00 |
| 1204 | 0.60 | 13.00 |
| 1404 | 0.82 | -9.00 |
| 1604 | 0.33 | -31.00 |
| 1804 | 0.00 | 0.00 |
| 2004 | 0.17 | 32.00 |
| 2204 | 0.48 | 85.00 |
| 2404 | 0.35 | 143.00 |
| 2504 | 0.27 | 167.00 |
| 2604 | 0.53 | 198.00 |
| 2704 | 1.00 | 234.00 |
| 2804 | 0.71 | 242.00 |
| 2904 | | |
| 3004 | | |

| | |
|---|---|
| LEVEL (dBm) | :-19.31 |
| S/N 0 (dB) | :23.54 |
| S/N 1 (dB) | :23.61 |
| FREQ OFFSET | :-0.04 |
| TIMING SKEW | :-23.00 |
| TRN DUR | :20.00 |
| GAIN HITS | :0.00 |
| PHASE HITS | :0.00 |
| DROPOUTS | : |
| IMP 0 | :145.00 |
| IMP 1 | :2.00 |
| IMP 2 | :1.00 |

( QUIT )

V.29 7200 bps -19.31 dBm  ISQM  PAGE, SNR
TRANSMISSION OF PAGE DATA

NON-INTRUSIVE NETWORK-BASED ANALYSIS OF FACSIMILE TRANSMISSIONS

TECHNICAL FIELD

This invention relates to facsimile communications. More specifically, this invention relates to characterizing facsimile traffic in a public switched telephone network and to measuring impairments of facsimile transmissions.

BACKGROUND OF THE INVENTION

Communication by facsimile is becoming increasingly important in many areas, particularly, in business communications, because documents may be sent by facsimile from point to point virtually instantaneously. The delays experienced in using other modes of sending documents, such as the postal service, are avoided in transmitting documents by facsimile. The speed with which documents can be sent from one place to another has resulted in greatly increased use of facsimile, which makes it increasingly important that an uninterrupted and reliable level of service be provided on public switched telephone networks so that successful facsimile transmission of an increasing number of documents may be accomplished without significant degrees of impairment. It, therefore, has become increasingly important that the facsimile traffic through a public switched telephone network be accurately characterized. It also has become increasingly important that any impairments of facsimile transmissions be rapidly identified and the source of those impairments be accurately determined so that corrective action may be taken.

Until now, there has been no way to monitor and diagnose, actual facsimile transmissions. There is no available monitoring equipment which obtains convenient switched access to desired portions of the traffic flowing through a public switched telephone network the measure and characterize facsimile transmissions. There is nothing available which analyzes the protocols present in facsimile transmissions and ties that analysis to impairment measurements of the page data in those transmissions. There is no currently available capability of accurately identifying network and customer premises impairments during facsimile transmissions.

Prior techniques of measuring impairments affecting facsimile transmissions involve intrusive techniques which use special test signals which are monitored to ascertain any problems with the transmissions path. This results in test conditions which do not duplicate or simulate the actual conditions experienced during real facsimile transmissions. Thus, the results obtained from these intrusive techniques may not accurately reflect the situation experienced in the course of making a facsimile call. One particularly important deficiency of intrusive testing is that actual customer premises equipment is not involved in making the intrusive tests. Therefore, problems in completing facsimile transmissions caused by the customer premises equipment will not be identified as such with these techniques. The sources of impairment, therefore, may not be accurately identified by intrusive techniques. In addition to the fact that different equipment is connected to the network, the source of those impairments may also not be found due to the artificial nature of intrusive testing. Moreover, the portion of a communications network being tested must be taken out of service to accomplish the testing in accordance with prior techniques, and thus this part of the network will be unavailable for normal use.

Prior devices which measure communications signals are not able to adequately characterize a facsimile transmission non-intrusively as the transmission takes place. Moreover, if it were attempted to use this equipment for characterizing facsimile transmissions, the equipment only would be able to obtain dedicated access to a single facsimile apparatus at a time. Thus, identification of all the possible problems in a large communications network, such as a public switched telephone network, are impossible or impractical. There has been no equipment available which is capable of conveniently measuring in any meaningful fashion facsimile traffic in a public switched telephone network so that sources of impairment to those transmissions could be effectively identified and rapid and effective corrective action could be taken.

Accordingly, there is a significant and long-standing unsatisfied need for equipment which can properly analyze actual facsimile transmissions in a public switched network.

SUMMARY OF THE INVENTION

The need identified above is met by an apparatus which non-intrusively monitors real time facsimile transmissions as they are occurring in a network. The apparatus can obtain convenient access to any part or all of the communication traffic flowing through a network node. It may characterize the amount and kind of facsimile calls being made and it may measure certain characteristics of those calls. The apparatus may detect certain characteristics of protocol signals in facsimile transmissions and may activate certain analog impairment measurements in response to the characteristics of the protocol signals.

One example of such a non-intrusive monitor of facsimile transmissions comprises a means responsive to selected inbound and outbound trunks of a central office switching system which identifies the presence of facsimile transmissions on those selected trunks. Selected parameters of the identified facsimile transmissions are determined and a user interface communicates to a user selected characteristics of, and any impairments found in, the measured facsimile transmissions. The non-intrusive nature of the facsimile transmission measurements permits the network to remain in service during the measurement procedures so that revenue is not lost during the measurement procedure. Measurement of actual facsimile transmissions experiencing impairments gives an accurate picture of what is going on in the course of those transmissions so that the identity and the source of impairments may be more accurately determined and so that prompt and efficient corrective action may be taken.

In another example of the invention, a user of a facsimile analyzer in accordance with this invention may select for analysis predetermined portions of the communications traffic flowing through a network node. The facsimile apparatus obtains non-intrusive access to the selected portion of the communications traffic for a predetermined time. Facsimile transmissions are identified and measurements are taken and recorded for each such transmission. Problems with each facsimile transmission are diagnosed. Statistical information about facsimile transmissions in the observed part of the communications traffic is derived. The data is collected and the diagnoses produced are stored in one or more data bases. The user can call up selected portions of this information on a user interface.

BRIEF DESCRIPTION OF THE DRAWINGS

FIGS. 12 to 12c illustrate examples of thresholds used by the impulse noise measurement circuit shown in FIG. 11.

FIG. 17 is an example of a country list available to a user of a facsimile measurement apparatus in accordance this invention.

FIG. 18 is an example of a trunk list available to a user of a facsimile measurement apparatus in accordance this invention.

FIG. 20 is an example of a session summary produced in accordance with one example of this invention.

FIG. 21 is an example of a call list produced in accordance with one example of this invention.

FIG. 22 is a call summary produced in accordance with one example of this invention.

FIG. 23 is an events list produced in accordance with one example of this invention.

FIG. 24 is an example of analog impairment measurements displayed for one of the events in FIG. 23.

DETAILED DESCRIPTION

Figure 1:
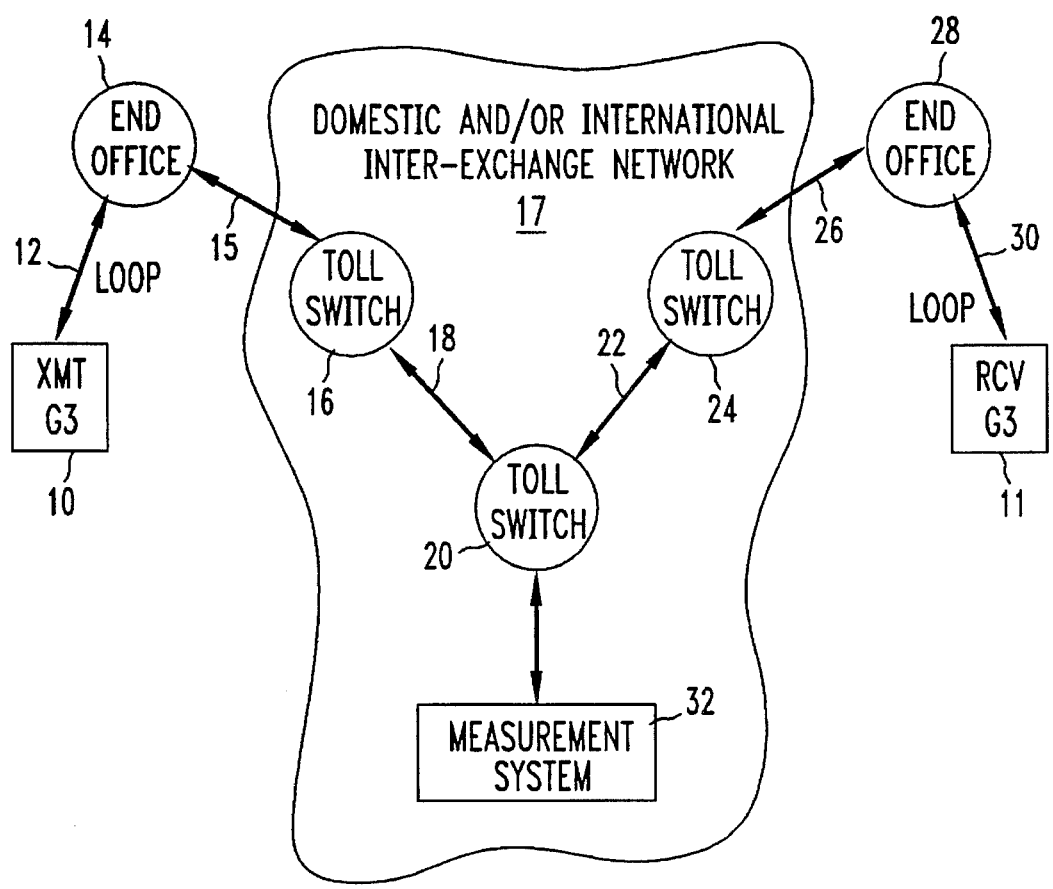
FIG. 1 illustrates an example of a public switched telephone network in accordance with this invention containing an apparatus for characterizing and measuring impairments of facsimile transmissions carded by the network.

FIG. 1 is a schematic diagram showing an example of a public switched telephone network containing a facsimile analyzer for purposes of monitoring facsimile calls in the network. FIG. 1 also shows illustrative transmitting facsimile equipment, receiving facsimile equipment, and the lines, trunks, and nodes in the network used to complete a facsimile call between the transmitting facsimile equipment and the receiving facsimile equipment. In FIG. 1, a transmitting facsimile equipment 10, which may be a so-called Group 3 facsimile machine, is connected to a public switch telephone network via a subscriber line 12, which may be a pair of wires.

The subscriber line 12 is connected so as to form a subscriber's loop between the transmitting facsimile equipment 10 and an end office 14 of the public switched network. In the U.S., the end office 14 may be a local exchange office of one of the Regional Bell Operating Companies (RBOC's) and the like. The end office 14 may be connected by a trunk 15 to a toll switch 16 located in one of the central offices in a domestic or international inter-exchange long distance network 17. The inter-exchange network 17 also contains other toll switches and trunks which are used to connect other calling parties not shown in FIG. 1 to other called parties also not shown in FIG. 1. The long distance network may be one of those provided by a long distance carrier such as AT&T. Only the toll switches and trunks connecting the transmitting facsimile equipment 10 with the receiving facsimile equipment 11 are shown in FIG. 1. In addition to those items already described, the connection between the transmitting facsimile equipment 10 and the receiving facsimile equipment 1 t further comprises a trunk 18 connecting a toll switch 16 to a toll switch 20, a trunk 22 connecting toll switch 20 to a toll switch 24, a trunk 26 connecting the toll switch 24 to another end office 28 which is connected to the receiving facsimile equipment 11 via another subscriber line 30.

The public switched network of FIG. 1 has a system for identifying facsimile transmissions in selected portions of the total communications traffic on the network and for performing certain measurements and analysis on the identified facsimile transmissions which are useful in identifying the amount and kind of facsimile transmissions flowing in the network and the extent to which successful facsimile service is being accomplished on the network. These measurements are made non-intrusively in real time as the facsimile transmissions are occurring. These measurements are useful in diagnosing the causes of difficulties in successfully completing facsimile transmissions through the network and in characterizing in some meaningful way the amount and kind of facsimile transmissions through the network.

In this regard, the network of FIG. 1 contains one or more facsimile measurement systems connected to components of the network through which the measurement system can obtain non-intrusive access to some or all of the communications traffic in the network.

One of those facsimile measurement systems 32 is shown in FIG. 1. That measurement system 32 is connected to one of the toll switches 20 so that selected portions or all of the communications traffic through the toll switch 20 can be observed in a non-intrusive manner. Facsimile calls can thereby be identified, certain characteristics of those facsimile calls can be measured, and the nature and source of any impairments of the calls can be found and diagnosed. Although FIG. 1 explicitly shows only one measurement system 32 connected to one switch in the public switched network, any number of measurement systems may be used anywhere else in the network where access to desired traffic through a selected part of the network may be easily gained. As is apparent from the description below, individual customer problems can be detected and addressed and aggregate fax service usage and quality in the network may be determined.

Figure 2:
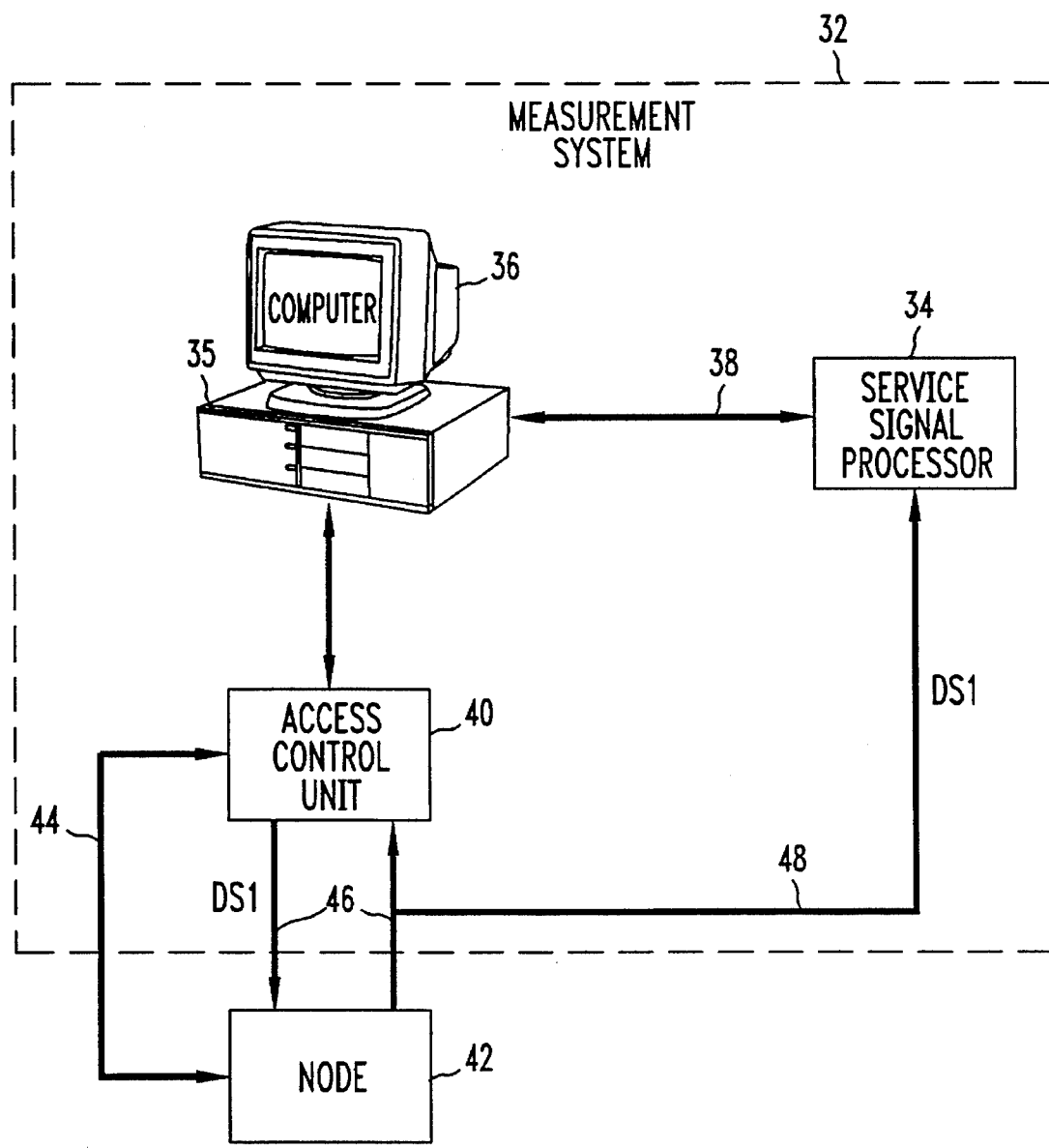
FIG. 2 is a detailed schematic diagram showing an example of a connection between a facsimile measurement apparatus and a node in a public switched telephone network like the one shown in FIG. 1.

FIG. 2 shows a more detailed example of an architecture which contains a facsimile measurement system 32 connected to a portion of a public switched telephone network so as to gain access to some or all of the communications traffic in the network. The architecture of FIG. 2 comprises a measurement system 32 for analyzing facsimile traffic on a selected portion of a public switched telephone network. The measurement system 32 also comprises a service signal processor 34 which analyzes one or more calls. Such analysis includes identification of the presence of facsimile calls and the boundaries of those calls, performance of signal classification, measurement of certain signal characteristics, and presentation of the results to a diagnostic computer 35 and a user interface 36. The computer 35 receives data from the service signal processor 34 on a suitable link 38, which may be, for example, a X.25 9.6 kb/sec data link. The data received from processor 34 is stored in one or more data bases contained within the computer. The computer 35 contains software which performs diagnostic analysis of the data from processor 34 which may help to identify the potential sources of any abnormalities in the characteristics of facsimile calls measured by processor 34. Any desired part of the data collected by the processor 34 and stored in the data base in the computer 35 may be called up and displayed by a user through the user interface 36. The user interface 36 operates in response to appropriate commands generated by a user via a peripheral device such as a mouse or keyboard connected to the computer 35.

An access control unit 40 is linked to a network node 42 controlling the flow of communications traffic through the public switched telephone network of FIG. 1. The network node may be any of a variety of equipment through which communications traffic flows. For example, the network node 42 may be a central office switching system which controls the connection between a variety of inbound and outbound trunks of the public switched telephone network. By way of example, such a switching system may be an AT&T 4ESS™ or 5ESS® switching system. The network node 42 may also be similar switching systems from other manufacturers. One other suitable example of a network node 42 in FIG. 2 is a digital cross-connect system such as a digital access cross-connect system (DACS) made by AT&T.

The access control unit 40 may be any circuit which can access a selected portion of the communications traffic flowing through the network node 42. For example, the access control unit 40 may be the digital test unit (DTU) in an AT&T remote measuring system (RMS). The access control unit 40 is responsive to a command from the computer 35 generated in response to a request by a user of the facsimile measurement system 32 for information about a specific portion of the communications traffic flowing through the network node 42. The access control unit 40 makes a suitable request, via an input/output I/O link 44, for the network node 42 to map one or more DS0 signals flowing through it, including any signalling information corresponding to the phone calls represented by the selected DS0 signals, to a DS1 link 46 connecting the access control unit 40 with the network node 42. As those skilled in the art are aware, one phone call comprises a pair of DS0's, a transmit DS0 and a receive DS0, which may be mapped to adjacent DS0 time slots on the DS1 signal in the line 46. The techniques of mapping signals from a network node to a predetermined place in a bit stream like the one between the network node 42 and access control unit 40, by copying data relating to a specific DS0 stored from time-to-time in specific locations in the network node onto the bit stream on line 46, are well-known to those skilled in the art and, therefore, are not described further. Any such mapping technique may be used to carry out this invention. The selected DS0 signals mapped onto the bit stream on line 46 are directed to one input of the service signal processor 34 via the operation a digital bridging repeater 48 connecting the line 46 to the input of the service signal processor 34. The service signal processor 34 then identifies call boundaries from signalling information associated with the DS0 signal, identifies the nature of any phone calls on the selected DS0, and makes certain measurements and observations regarding any facsimile transmissions associated with that DS0 signal. Signalling information, which is used by the service signal processor 34 to identify call boundaries, may be communicated to the service signal processor 34 by setting the state of one or more predetermined bits in the stream of bits flowing between the network node 42 and the access control unit 40. For example, two state robbed A-bit signals may be used. Alternatively, the call signalling may be communicated to the service signal processor 34 via a communication channel which is separate from the DS1 link 46.

The apparatus of FIG. 2 may be operated in two separate modes. The first mode is a full duplex monitoring mode which enables the service signal processor 34 to monitor both directions of one or more switched connections through a network node 42 such as a 4ESS® type switch. The second mode is a directed test access mode in which there is the establishment of a full duplex monitor connection directed to a specific switched connection originated by a customer experiencing problems in completing a specific facsimile transmission.

Figure 3:
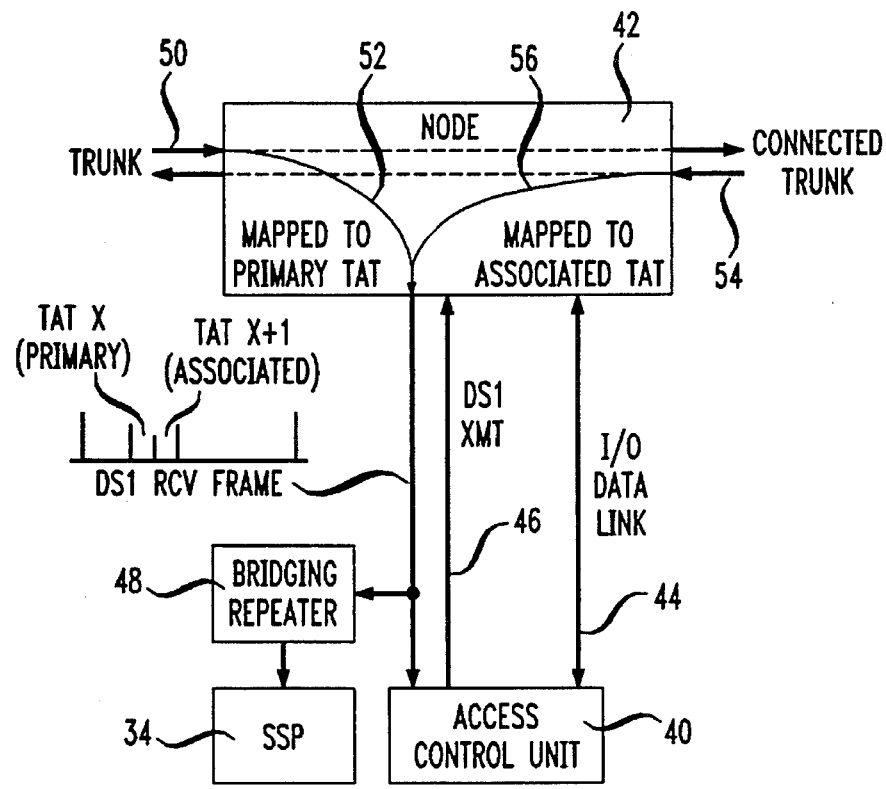
FIG. 3 illustrates a full duplex monitoring function carded out by a facsimile measurement apparatus in accordance with this invention.

The full duplex monitor capability of the apparatus of FIG. 2 is illustrated in more detail in FIG. 3. As shown in FIG. 3, the access control unit 40 causes the network node 42 to map a desired portion of the communications traffic through the node onto the link 46 between the access control unit 40 and the network node 42. In one example of the invention, the access control unit 40 sends a command over the link 44 to the network node 42 which causes the network node 42 to map a specific DS0 signal flowing through the network node to a preselected slot on a DS1 receive frame carried by the link 46. The selected DS0 signal is mapped from a trunk 50, as indicated by arrow 52, to a slot designated primary TAT X (standing for test access trunk X) in the DS1 receive frame on the link 46. A corresponding DS0 on a connected trunk 54 is mapped, as indicated by line 56, to an adjacent slot in the DS1 receive frame designated associated TAT X+1 (standing for test access trunk X+1) in FIG. 3. The DS0 on trunk 54 is the DS0 which is the return associated with the selected DS0 on trunk 50 by the switch fabric of the network node 42. Monitoring both the DS0 associated with the send leg of trunk 50 and the corresponding DS0 associated with the receive leg of trunk 54 thus provides a full duplex monitor for a period of time specified by the user. A bridging repeater 48 provides the signals in the primary and associated TAT slots to the service signal processor 34 for measurement and analysis.

In one embodiment of the invention, the monitoring function is established by a suitable user command directed to the computer 35 which then causes the access control unit 40 to provide the service signal processor 34 access to a desired portion of the traffic through the network node 42 for an indefinite period of time until the monitoring operation is terminated by an abort command entered by the user into the computer 35. In another embodiment, the computer 35 may be programmed to provide a monitoring operation for a predetermined amount of time with automatic discontinuance of the monitoring operation after the expiration of the predetermined amount of time.

Individual problems experienced by a network customer in completing facsimile transmissions can be assessed by facsimile analysis equipment in accordance with this invention by operating that equipment in the directed test access mode mentioned above. In this mode, a customer experiencing difficulty in completing a facsimile transmission first calls a special number, such as a special 800 number, which establishes a dialog with network personnel responsible for operating facsimile measuring equipment in the telephone network. The customer notifies these personnel of the nature of the problem, the identity of the destination telephone number to which facsimile transmission is being attempted, and the identity of the telephone number from which the facsimile transmission is being sent. The network personnel specify to the customer a special maintenance telephone number (e.g., a "101" number). The customer will use this telephone number in another attempt to complete his contemplated fax transaction to its intended destination. This number will be used instead of the normal destination phone number used in the past which has just been given to maintenance personnel. The maintenance number corresponds to a specific trunk appearance in the switch which when called is then terminated by a predetermined test port module in the access control unit 40. After giving the customer the special maintenance number, the network personnel then program the access control unit 40 to answer and respond to an incoming facsimile call from the customer made to the maintenance number. The service signal processor 34 is activated to start a measurement process involving monitoring of appropriate DS0's in the DS1 channels between the network node 42 and the access control unit 40. The monitored DS0's are those which have been designated to carry transmission and signaling information flowing between the network node 42 and the access control unit 40 and which are associated with the facsimile call from the customer. As in the case of the monitoring operation, two state robbed A-bit signalling may be used to convey signalling information from the network node 42 to the access control unit 40 and the service signal processor 34.

Figure 4:
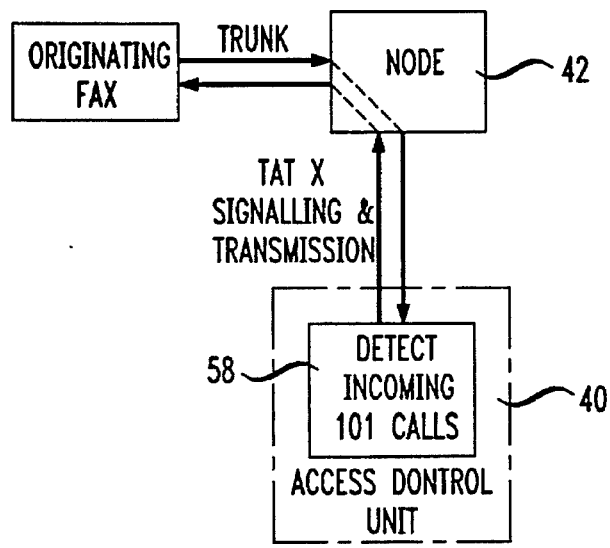
FIGS. 4 to 6 illustrate the steps carried out by a facsimile measurement apparatus in accordance with this invention to accomplish a full duplex directed test access function.

As shown in FIG. 4, when the user then places his facsimile call to the special maintenance telephone number, a detection circuit 58 in the access control circuit 40 detects the presence of an incoming maintenance call which is directed by the network node 42 to the access control unit 40. The presence of the maintenance call may be detected by an electronic device which recognizes a special ringing signal sent by the network node 42 to the access control unit 40 when the customer places the maintenance call. For example, the special ringing signal may be a repeating cycle of off-hook and on-hook signals, each such signal of predetermined duration, conveyed to the access control unit 40 in the signalling channel between the node 42 and the access control unit 40.

Figure 5:
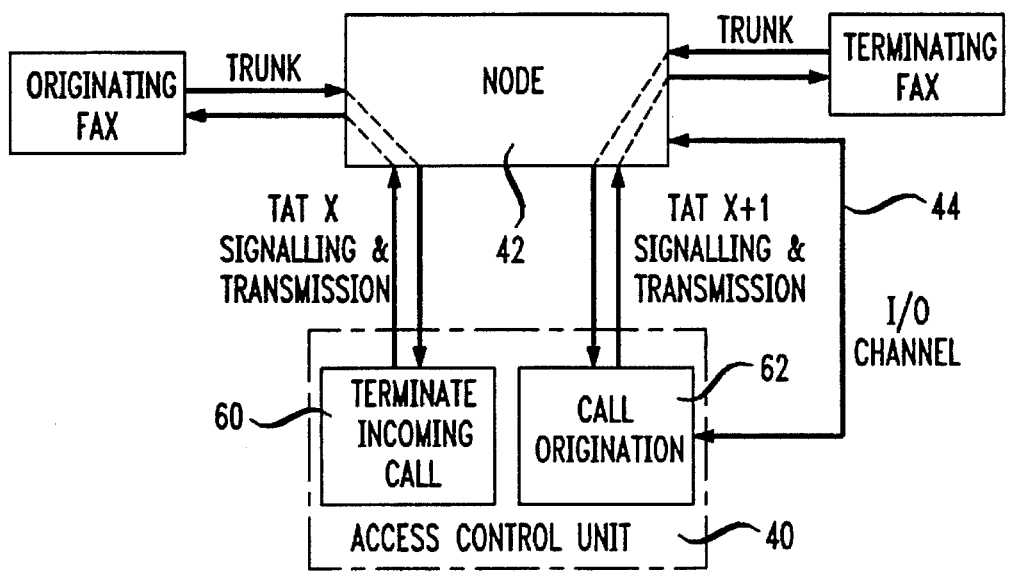

As shown in FIG. 5, the access control unit 40 contains a call termination device 60 which will answer the call and send an off-hook designation back to the customer at the origination point. As also shown in FIG. 5, a call origination device 62 in the access control unit 40 places a call to the intended recipient of the facsimile call using conventional multifrequency outpulsing techniques in accordance with the recipient's telephone number received from the sending customer. This call forwarding function can be accomplished by an out-tandem call establishment procedure in which the access control unit 40 emulates the signalling functionality of a trunk circuit coming into the network node during the call set up procedure. The call forwarding function can also be accomplished by the network node itself establishing the call by outpulsing upon receiving an appropriate command to do so on the input/output line 44 in FIG. 5.

Figure 6:
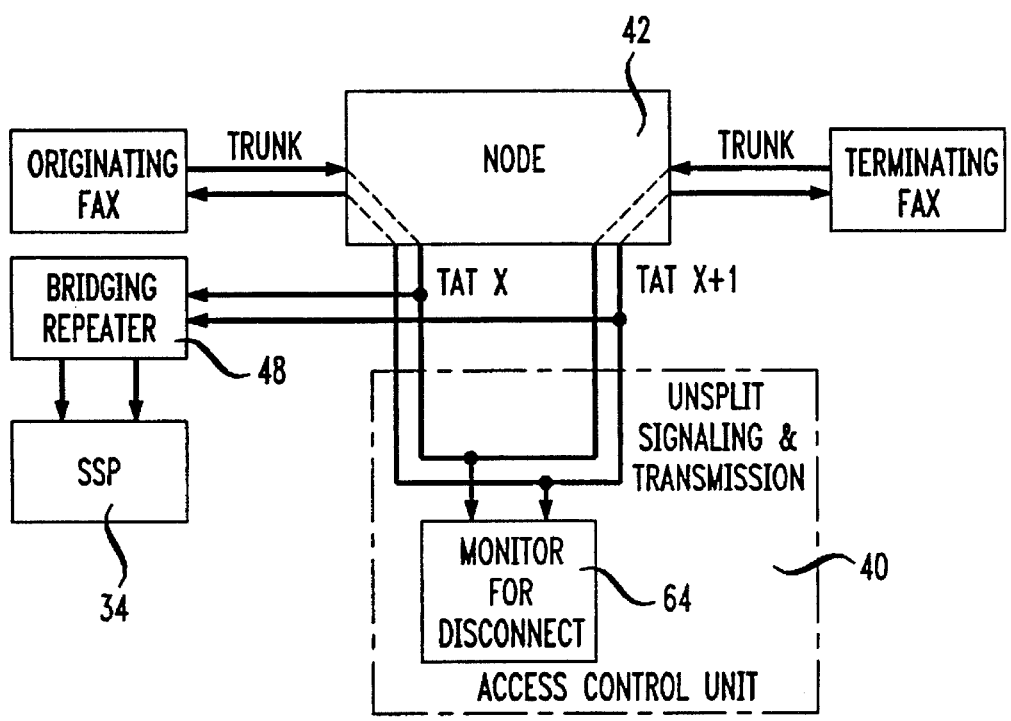

Once the digits of the telephone number given by the customer have been outpulsed and the call between the access control unit 40 and the facsimile recipient has been established, the access control unit 40 reconfigures the transmission and signalling channels so that continuity is established between the origination and destination facsimile machines. Specifically, the receive signals (transmission and signalling) from the origination point are connected to the transmit signals directed toward the destination point and vice versa. This cross-connect capability or unsplit connection allows the service signal processor 34 to measure signals from both directions via the bridging repeater 48 as shown in FIG. 6. After the call has been established, the service signal processor 34 makes measurements of the facsimile call between the origination point and the destination point and collects data about the call.

A disconnect monitoring device 64 in the access control unit 40 monitors the connection between the origination facsimile machine and the destination facsimile machine for a signal indicating a disconnect. When a disconnect signal is detected, the access control unit 40 removes the unsplit configuration and transmits an on-hook disconnect signal in both directions. When no further test calls from this customer are to be analyzed, the access control unit 40 should be disabled from responding to incoming call attempts by unauthorized sources. This constitutes a security mechanism which prevents the execution of unauthorized call forwarding procedures in the access control unit 40.

Figure 7:
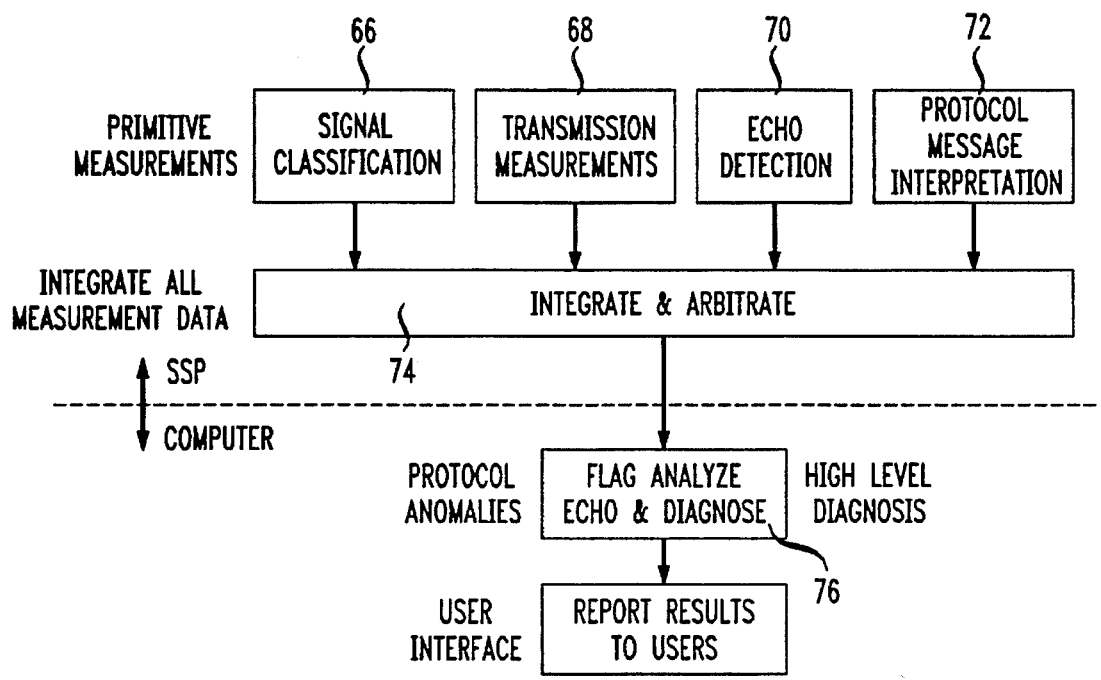
FIG. 7 illustrates the main circuit elements in a facsimile analysis apparatus in accordance with this invention.

FIG. 7 is a representation of the main functional circuit elements in the service signal processor 34, the diagnostic computer 35, and the user interface 36. As shown in FIG. 7, the service signal processor 34 comprises a number of circuits which perform certain measurements on facsimile transmissions passing through the network node 42. Those circuits include a signal classification device 66 which is responsive to selected signals flowing through the network node 42 to determine what kind of signals they are. Specifically, the signal classification device may determine the bit rates of those signals and what type of modem was used in producing them. A circuit 68 is responsive to selected parts of certain facsimile transmissions and makes a set of analog impairment measurements relating to those signals nonintrusively and in real time. Further details of the signal classification circuit 66 and transmission measurement circuit 68 are described below.

Another circuit element 70 in FIG. 7 detects the magnitude and delay relating to the appearance of certain echo signals associated with the facsimile transmissions being monitored by the service signal processor 34. The echo and delay measurements are made in both directions of a facsimile call. In the example of a G3 facsimile call, the predetermined characteristics of V.21 signals sent during the transmission of leading HDLC flag characters and the V.29 "random CD" training sequences are employed as known signals during the facsimile transaction. The circuit element 70 searches for those signals continuously on both directions of a facsimile call. The time delay between alternating appearances of the same signal in two different directions is used as a measure of the delay experienced in a particular direction. In addition, the difference in amplitudes of the primary and echo V.21 signals may be used to compute an echo return loss. In order to obtain more exact measures of the echo path characteristics, echo canceling techniques may be used for detecting echoes of the V.29 signal during page transmission. The relatively large bandwidth characteristics of the V.29 signal are used advantageously to extract more information about the time and frequency response of the echo channel looking in the same direction as the page transmission.

Echo return loss and delay may be measured by comparing the signal level and arrival times of demodulated facsimile protocol messages on the primary and echoed sides of the transmission. The comparison of signal levels and arrival times may be made by directly observing the arrival times and signal levels of demodulated primary and echo signals in facsimile transmissions or by using signal correlation techniques. For example, if a demodulated V.21 HDLC facsimile protocol message on one side of a call is followed a short time later by the same demodulated V.21 HDLC facsimile protocol message on the opposite side, the echo return loss is given by the difference in signal level between the primary and echoed replications, while the difference in arrival time of the two messages gives echo delay. The half-duplex nature of the facsimile protocol and the robustness of the modem used for sending the protocol messages in the presence of channel impairments allow this technique to work.

The service signal processor 34 also includes a circuit element 72 which demodulates and interprets certain protocol messages which are part of the monitored facsimile transmissions. For example, the circuit element 72 may demodulate and interpret the T.30 protocol messages associated with a G3 facsimile transmission.

Figure 7A:
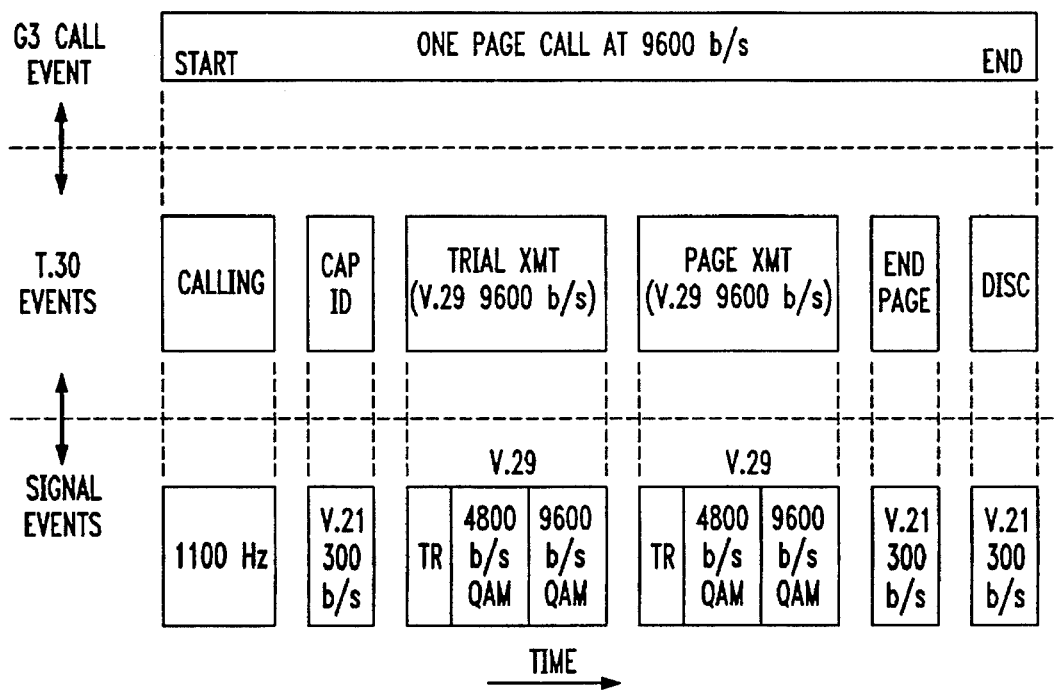
FIG. 7a illustrates the main signal components flowing from a transmitter to a receiver during an example of a typical G3 facsimile call.

As illustrated in FIG. 7a, a G3 facsimile call comprises several components. FIG. 7a illustrates an example of a single page G3 facsimile transaction displayed in various levels of detail for the transmissions made by the sending facsimile equipment to the receiving facsimile equipment. Transmissions made from the receiving facsimile equipment to the transmitting facsimile equipment are not shown in FIG. 7a, but they are apparent to those skilled in the art who are aware of the nature of G3 facsimile transmissions and the T.30 protocol. Transmissions from the receiver to the sender may include signals notifying the transmitter of the characteristics and capabilities of the receiver, confirmation of receipt of training and page signals, notification of the transmitter that there has been an unsuccessful transmission by the transmitter, and requests of the transmitter for changes in characteristics of the transmission such as a request for reduced bit rates and the like.

At its highest level, the entire call shown in FIG. 7a is considered as simply a one page transaction at 9600 bits per second. At an intermediate level, the various T.30 constituents are shown comprising tonal, V.21, and V.29 messages. At the lowest level, detailed line signals are shown in FIG. 7a. When making non-intrusive impairment measurements, the protocol used during the G3 transaction must be tracked so that other functions such as echo measurements on the V.21 signals and impairment measurements on the V.29 signals are switched in at the proper time. Besides controlling measurement functions, the T.30 tracking also interprets messages when facsimile transactions have problems. The messages are saved for later diagnosis by the computer 35. Real time tracking and control will be accomplished for all aspects of the T.30 protocol described below. Other information may be collected in accordance with this invention for other kinds of facsimile calls and other kinds of protocols.

In the situation of a G3 facsimile call using a T.30 protocol, the protocol signals in the transmission may be measured to see if they are a standard version of the T.30 protocol or some nonstandard protocol. Any information in the protocol signals identifying the manufacturers of the sending and receiving facsimile equipment will be noted. Transmission rate information will also be sensed. Specifically, the protocol tracking circuit will ascertain the initial bit rate at which information is being sent from the sending equipment to the receiving equipment and will note any situations where the equipment falls back to some lower bit rate. The protocol tracking circuit keeps a certain amount of statistical information about each facsimile call. The statistical information may include the number of pages in the transmission, the rates at which each page is sent, and the time it takes to complete the transmission of each page. The protocol tracking circuit may also note any turn around situations whereby the answering facsimile machine sends pages to the calling facsimile machine. If a T.30 error correction mode is being employed, whereby the receiving facsimile equipment detects that some or all of a transmitted page has not been properly sent and received and then requests a retransmission of the inadequately delivered portion of the page transmission, the protocol tracking circuit may detect the use of this error correction mode and may keep certain retransmissions statistics relevant to its use. The protocol tracking circuit may also be configured to detect the presence of tones such as echo protection tones, the auto-originate 1100 Hz calling tone, and the auto-answer 2100 Hz answer tone.

In the circuit of FIG. 7, the outputs of the measurement circuit elements 66, 68, 70, and 72 are directed to a circuit 74 which integrates and arbitrates all of the measurement data produced by those measurement circuit elements. The integration and arbitration circuit element 74 sends the measurement data it receives in a predetermined order to the input of a high level diagnostic circuit 76 which flags certain anomalies in the measured facsimile transmissions, such as protocol anomalies. The circuit 76 also analyzes the measurement data it receives from the integration and arbitration circuit 74 and produces a diagnosis of problems which occur in the monitored facsimile transmissions. The results of the signal measurements are communicated to users through a variety of reports produced by the user interface 36 described in more detail below.

Figure 8:
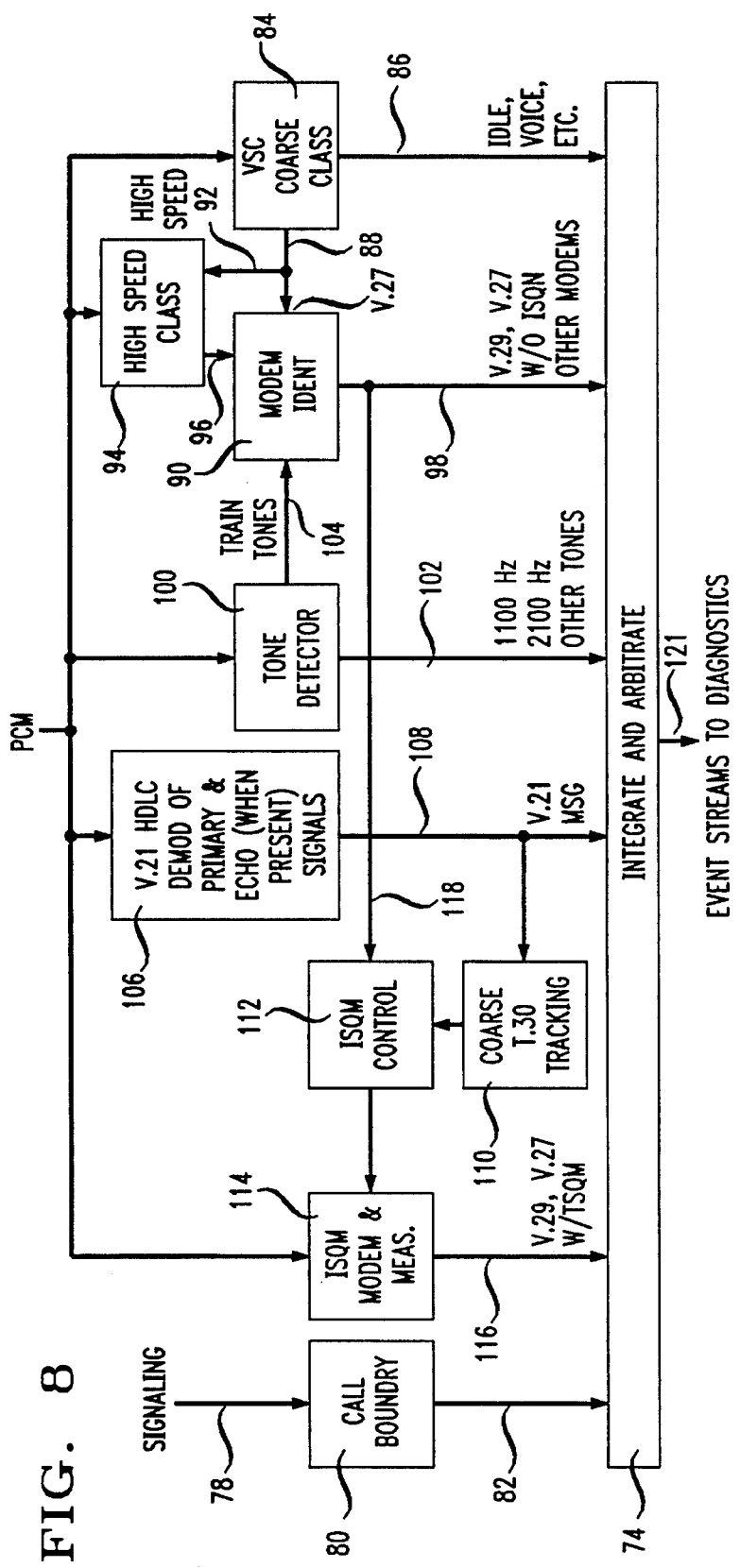
FIG. 8 is a more detailed schematic diagram of some of the circuit elements shown in FIG. 7.

FIG. 8 is a more detailed description of the service signal processor shown in FIG. 7. The circuit of FIG. 8 is responsive to signalling information from the network node 42 appearing on an input line 78. A call boundary identification circuit 80 receives the signalling information and produces an output signal on line 82 which identifies when a telephone call carried by a monitored DS0 begins and when it ends.

An additional function performed by the circuit of FIG. 8 includes signal speed classification involving the real time identification of the characteristics of unknown voice band signals. In this example of the invention, the voice band signals comprise 64 kilobit pulse code modulation (PCM) representations of the intelligence being transmitted between two users of the public switched telephone network on a DS0 slot selected for monitoring by the facsimile measurement apparatus of this invention. A coarse voice band signal classification circuit 84 receives the PCM signals and produces an output on line 86 identifying the presence of electrical energy in the selected DS0. In this manner the idle portions of a telephone call can be separated from active signal spurts which are further processed. Once an active signal spurt is identified by the coarse classification circuit 84, the signal into the circuit 84 is next classified as either a voice signal or a nonvoice signal. If the signal is identified as a nonvoice signal, it is assumed to be voice band data and the circuit 84 performs a coarse speed classification which identifies the signal as being in one of a plurality of speed categories, such as very low speed, low speed, medium speed, and high speed. If the nonvoice signal is not in one of the speed categories, it may be labeled "unknown" and the presumption of voice band data may be considered to be wrong. Examples of very low speed voice band data signals include V.21 and V.23 signals. Examples of low speed voice band data signals include V.22 bis and V.26 signals. Examples of medium speed voice band data signals include V.27ter signals. Examples of high speed voice band data signals include V.32 and V.29 signals.

The specific techniques for classifying the signal input to the classification circuit 84 are known to those skilled in the art and are described no further here. An example of a suitable voice band signal speed classification circuit 84 may be found in Benvenuto U.S. Pat. No. 4,815,136, the content of which is hereby incorporated by reference in its entirety. A signal relating to the outcome of the classification process performed by the circuit 84 is delivered to an output line 88 to one input of a modem identification circuit 90 which identifies on line 98 the nature of the modem in the transmitting equipment in light of the speed classification made by the classification circuit 84.

If it is determined that the PCM signal directed to the input of the coarse classification circuit 84 is one of the high speed types of voice band data signals, an indication of such is directed by the coarse classification circuit 84 on a line 92 to one input of a high speed classification circuit 94. The high speed classification circuit 94 also receives on another input the PCM signal which is being classified. The high speed classification circuit is activated by the signal on line 92 to make a more specific determination of what kind of high speed signal the input PCM signal is. The high speed classification circuit 94 directs a signal representing which of the high speed signals describes the speed characteristics of the PCM signal on an output line 96. This signal is sent to one input of the modem identification circuit 90. The modem identification circuit 90 is responsive to the speed signal on line 96 to produce an output on line 98 which is related to the character of the modem in the transmitting facsimile equipment. The nature of the high speed classification process is known to those skilled in the art and is not described further here. An example of a high speed classification circuit may be found in Benvenuto et al. U.S. Pat. No. 4,979,211, the entire contents of which is hereby incorporated by reference into this application.

A tone detection circuit 100 is also responsive to the input PCM signal to identify the presence of certain tones normally found in facsimile transmissions. The tone detection circuit 100 identifies, for example, the 1100 Hz. and 2100 Hz. tones which may be present at the beginning of a facsimile call. The tone detection circuit indicates the presence of such tones by providing a suitable signal on output line 102. The tone detection circuit 100 may be any circuit which can indicate the presence of specific sinusoidal signals present in facsimile transmissions. For example, the tone detection circuit 100 may include adaptive notch filtering circuitry which changes its output in response to the presence of the tone which it is desired to detect. The tones detected by the detection circuit 100 also include those tones produced as a result of modem training sequences transmitted from the transmitting facsimile equipment to the receiving facsimile equipment. These tones are the result of predetermined sequences of symbols sent to the receiving equipment to train the modem in the receiving equipment so that the intelligence communicated between the transmitting equipment and the receiving equipment is properly demodulated by the receiving equipment. The training sequences are such that the energy transmitted from one facsimile machine to another falls primarily at a number of distinct frequencies. Identification of these frequencies in the PCM signal is thus an indication of the presence of the transmission of training sequences between the two facsimile machines. The specific frequencies which are found by the tone detection circuit 100 in connection with detection of training tones and sequences is useful in identifying the characteristics of the modem transmitting the training sequences and thus is an indication of the nature of that modem. A signal representing the nature of the training tones is directed on an output line 104 of the tone detection circuit 100 to one input of the modem identification circuit 90. Indications of certain training tones from the tone detection circuit 100, as well as the results of speed classification, are used by the modem identification circuit 90 to identify the type of modem used in the transmitter. As indicated in FIG. 8, the signal on the output line 98 from the modem identification circuit 90 represents the kind of modem which is transmitting and producing the PCM signal input to the circuit of FIG. 8. For example, the output of the modem identification circuit 90 may indicate that the identified modem is a V.29 or V.27 modem producing page signals in a G3 facsimile call.

The circuit of FIG. 8 also includes a demodulation circuit 106 which demodulates the protocol portions of a facsimile call. Those protocol portions contain information and messages used by the sending and receiving facsimile machines to make sure that they are properly set up to send and receive facsimile signals and to make sure that the facsimile transmission is being successfully accomplished. The demodulator 106 produces an output signal on line 108 relating to the demodulated protocol messages in the PCM signal. In addition to the demodulation of primary protocol messages, the demodulator 106 also demodulates echoes of the primary protocol signals. In one example, the demodulator 106 demodulates the V.21 protocol messages in a G3 facsimile call as well as echoes of such V.21 protocol messages. Logic circuitry associated with the demodulation may be used to interpret the message content of the demodulated protocol signals from the protocol demodulator 106.

A protocol tracking circuit 110 receives the demodulated messages on line 108 and produces an output signal relating to the nature of page signals and trial transmissions (TCF's) in the facsimile transmission. The page signals are the part of the facsimile transmission which carries the information which is being sent from the transmitting facsimile equipment to the receiving facsimile equipment. In one embodiment, the protocol tracking circuit 110 detects the speed at which the transmitting facsimile equipment will be sending page data, information which is contained in the protocol signals sent between facsimile machines. This page speed information is directed to an input of an in-service quality measurement control circuit 112 which activates an in-service quality measurement (ISQM) circuit 114. The measurement circuit 114 makes certain analog impairment measurements on the page portion of the PCM facsimile transmission. These in-service quality measurements are made in light of the nature of the page signals, namely, the nature of the modem which transmits the page signals from the sender to the receiver. The nature of the modem along with the in-service quality measurements are directed to an output line 116 of the in-service quality measurement circuit 114.

One variation of the circuit of FIG. 8 includes detecting the nature of the transmitting modem from the output of the modem identification circuit 90 instead of detecting the nature of the transmitting modem from the information in the protocol signals. In this situation, the output of the modem identification circuit 90 is directed on an input line 118 into the in-service quality measurement control circuit 112. This alternative may be employed in situations where information from the protocol tracking circuit 110 about the nature of the transmitting modem is unavailable or unreliable for some reason. The output of the protocol tracking from circuit 110 is normally available before the start of a page or TCF transmission, while classification completed by the modem identification circuit 90 normally is complete only after the page or TCF signal has begun.

The outputs of the coarse classification circuit 84, the modem identification circuit 90, the tone detection circuit 100, the protocol demodulator 106, the in-service quality measurement circuit 114, and the call boundary identification circuit 80 are directed to inputs of a circuit 74 which integrates the measurements and arbitrates them. The integrate and arbitrate circuit 74 produces an output signal which represents and identifies the nature of certain predetermined events occurring in the PCM signal representing the facsimile transmission from the sender to the receiver. The integrate and arbitrate circuit 74 produces a signal which accurately reflects the timing and sequence of the events which are of interest in the facsimile transmission. The circuit 74 takes into account the differing amounts of time it takes to identify certain aspects of the facsimile transmission. For example, it may take several milliseconds for activity to be detected in the PCM channel being monitored, 32 milliseconds for the voice/nonvoice classification, 128 milliseconds for coarse speed identification, and several seconds for the modem to be fully identified by the modem identification circuit 90. The integrate and arbitrate circuit 74 looks for the presence of energy in the monitored DS0 which is closely spaced in time with respect to certain other events to create an indication that the event really occurred at the instant energy was detected in the DS0. For example, if signal activity or energy is detected within a couple of seconds prior to modem identification, then the circuit 74 assumes that the modem which has been identified was actually turned on at the time of activity detection by the coarse classification circuit 84 and not at the time the modem signal was formally identified by the modem identification circuit 90. The signal on the output 121 of the circuit 74 comprises an event stream which accurately reflects the events which have occurred in the transmission and an accurate reflection of the sequence and timing of those events.

Figure 9:
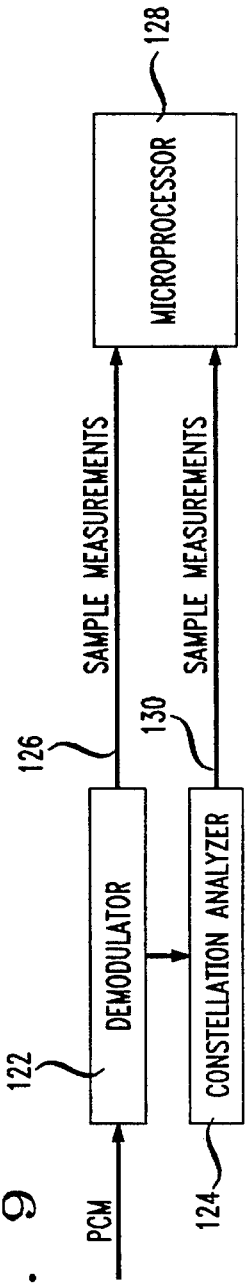
FIG. 9 is a more detailed schematic diagram of the circuitry used to implement the in-service quality measurement apparatus shown in FIG. 8.
Figure 10:
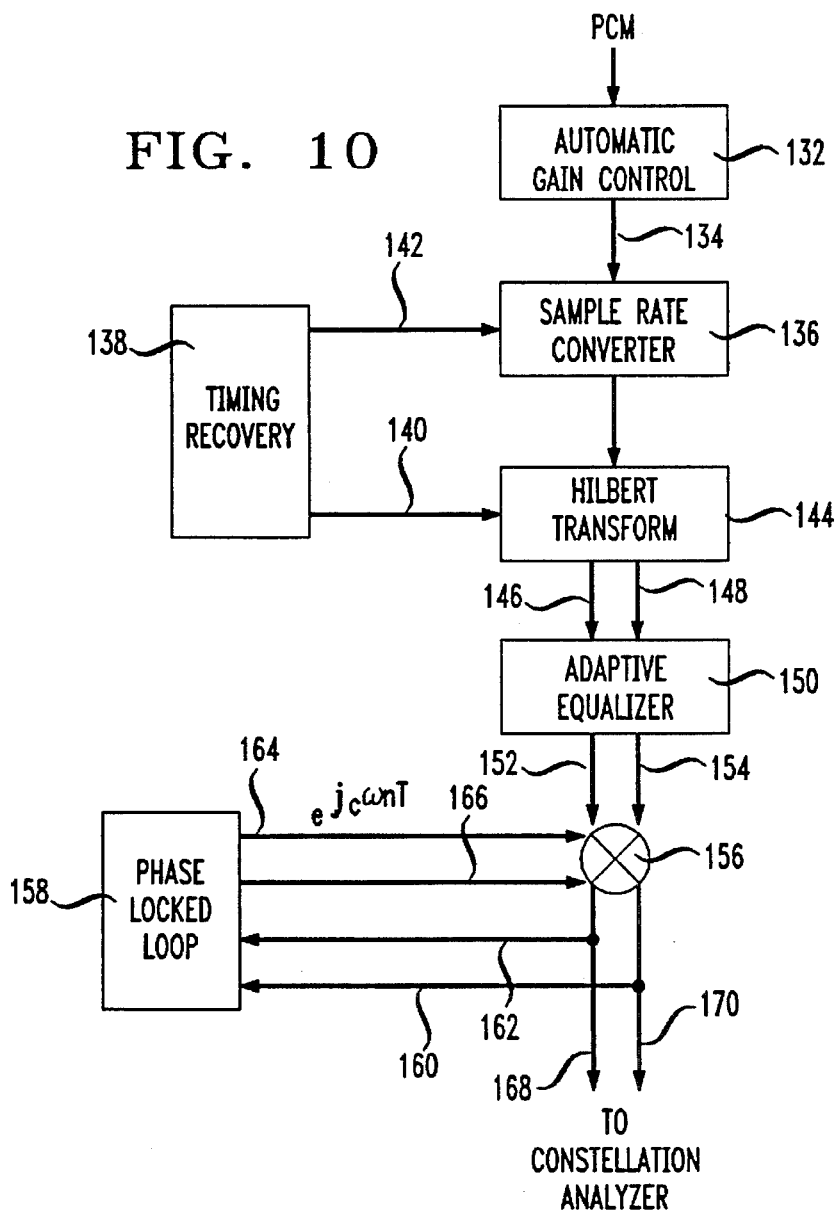
FIG. 10 is a more detailed schematic diagram of the circuitry in the demodulator shown in FIG. 9.
Figure 11:
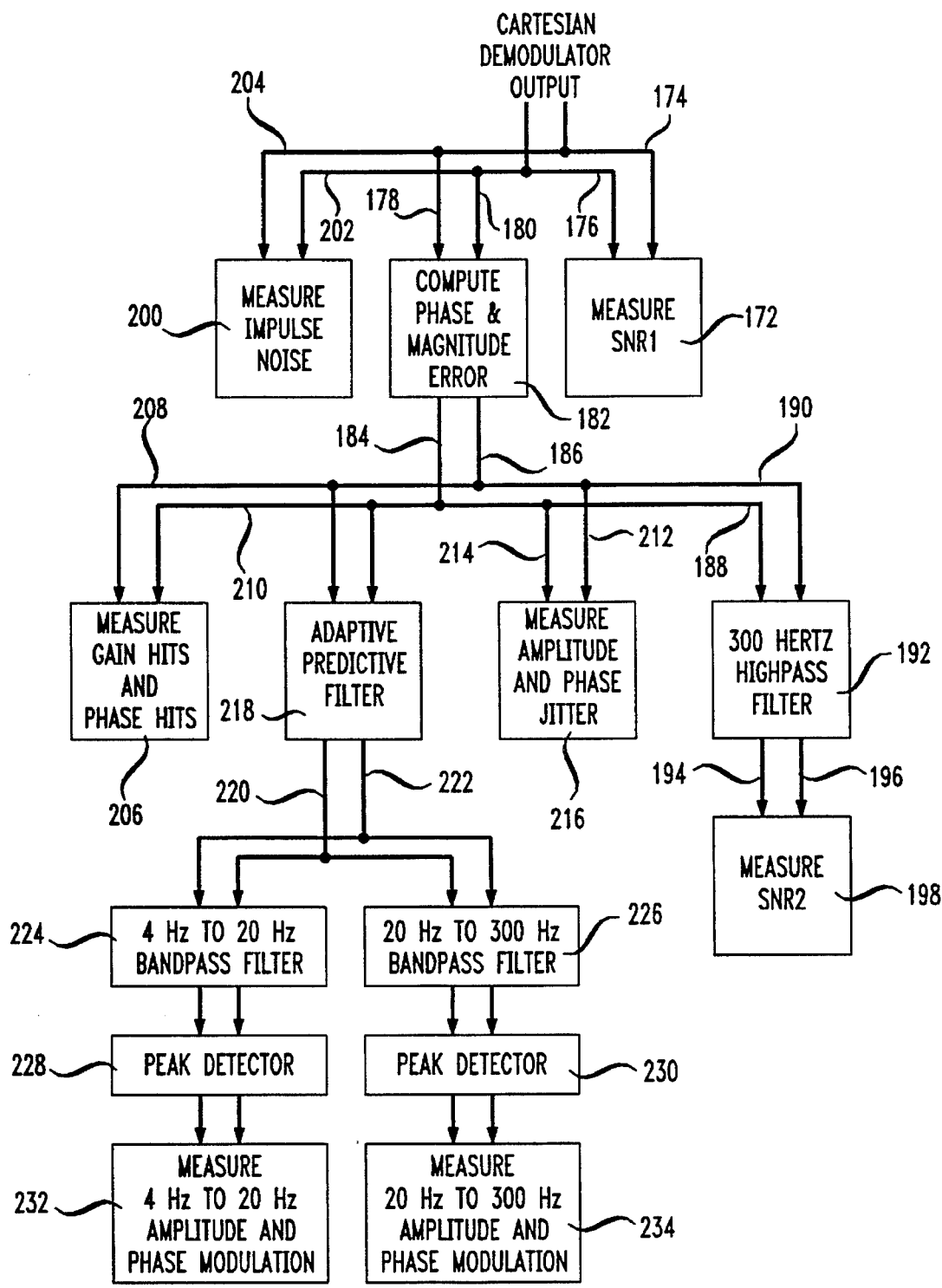
FIG. 11 is a more detailed schematic diagram of the circuitry in the constellation analyzer shown in FIG. 9.

FIGS. 9–11 illustrate further details of the circuitry associated with making the in-service quality measurements referred to above. Once signal classification has been made by the circuit of FIG. 8 and the measured signal has been specifically identified as a signal which is of interest as a facsimile call, non-intrusive impairment measurements are undertaken by the in-service quality measurement circuit of FIG. 8. For example, a V.29 or V.27ter modem signal used to transmit page data or TCF signals in a G3 facsimile call is measured to determine the quality of the channel. These are ideal signals to measure in determining the quality of the channel because of their wide bandwidths, particularly, the V.29 and higher speed signals, and because actual customer signals are measured.

The in-service quality measurement circuit 114 comprises a modem receiver which is switched on at a proper time to appropriately demodulate V.29 or V.27ter page signals to derive their data constellations. Impairments may then be measured by analyzing various aspects of the demodulation process and by analyzing various aspects of the received data constellations. In this example of the invention, specific impairments to be measured for all V.29 and V.27ter rates are as follows:

1. Signal Level;
2. Frequency Offset;
3. Timing Offset;
4. Attenuation Distortion;
5. Envelope Delay Distortion;
6. Signal to Noise Ratio;
7. Signal to Noise Ratio after Removal of correlated modulations;
8. Phase Jitter;
9. Amplitude Jitter;
10. Gain Hits;
11. Phase Hits;and
12. Impulse Noise.

As shown in FIG. 9, the PCM signal, which may be an A- or μ- law PCM signal, is directed to the input of a Cartesian demodulator 122 which removes the carrier frequency from the PCM signal. The demodulated PCM signal is directed to an input of a constellation analyzer 124 which ascertains differences between the actual constellation received from the demodulator 122 and the ideal constellation expected from the known characteristics of the modem identified by the modem identification circuit 90 or from the speed information in the facsimile protocol demodulated by the protocol demodulator 106. The constellation analyzer 124 may contain a slicer circuit for determining the differences between the actual constellation and the ideal constellation.

Certain sample measurements are derived from various aspects of the processes undertaken by the demodulator 122. Those sample measurements are directed on a output line 126 to an input of a microprocessor 128. Certain other sample measurements are derived from the error between the actual modem constellation and the ideal modem constellation derived by the constellation analyzer 124. The measurements derived from the constellation analyzer 124 are sent to another input of the microprocessor 128 on an output line 130.

In more specific terms, certain measurements may be obtained by examining the state of certain adaptive processes in the demodulator 122. The remaining measurements may be made by analyzing the constellation or "eye pattern" which is the output of the demodulator 122. At regular intervals, sample measurements are passed to the microprocessor 128 where they are processed to produce final measurements.

The microprocessor 128 receives the sample measurements derived from the demodulator 122 and the constellation analyzer 124 over the duration of a modem transmission. The microprocessor 128 reports a set of final measurements at the end of the modem transmission. For measurements of transient events in the modem transmissions, counters either in the demodulator 122 and constellation analyzer 124 or in the microprocessor 128 record the number of such transient events which were observed in the modem transmission. The final measurements reported by the microprocessor are the values contained in the transient event counters at the conclusion of the modem transmission. The values of the transient event counters maybe noted by the microprocessor 128 at periodic intervals during the transmission, for example, at one second intervals.

In this example of the invention, the final measurements of nontransient impairments are reported differently depending upon the length of the modem transmission. For example, the nontransient impairments are reported differently depending on whether the transmission duration is less than four seconds or greater than four seconds.

Facsimile transmissions include modem signals which contain page information. Such page transmissions in typical G3 fax calls are usually well over four seconds in duration. Facsimile transmissions also usually include a short duration trial transmission known as a training check. These training check transmissions contain predetermined sequences of bits and usually last about 1.5 seconds. If the training check sequences are not received properly, the facsimile machines in certain instances may fall back to transmission and reception at lower data rates than originally anticipated. In certain circumstances, the facsimile transmission may be terminated if the training check sequences are not transmitted and received properly. In addition to the training checks, there also may be short duration partial page retransmissions when the facsimile equipment is operable in certain error correction modes. If a facsimile transmission analysis apparatus in accordance with this invention is to analyze why short duration transmissions such as training check sequences and partial page retransmissions were not properly received, as many analog impairments as possible must be measured during a short period of time. Trial transmission analysis is essential when the connection is sufficiently bad that no actual pages are sent.

If the modem transmission lasts less than about 4 seconds, a set of sample measurements is reported to the microprocessor at the end of the short transmission. These sample measurements become the final measurements. Because of the short duration of the modem transmission, some measurements may not yet be available or accurate. The available measurements in this example of the invention include the overall signal-to-noise ratio, signal level, frequency offset, amplitude jitter, phase jitter, attenuation distortion, envelope delay distortion, and the quantity of transient events observed during the transmission.

One obstacle to measuring the nontransient impairments during short transmissions is that certain adaptive processes in the demodulator 122 have not yet had a sufficient amount of time to stabilize. Since they have not fully adapted, the results of measurements based upon these adaptive processes may still be corrupted at the end of the transmission. The preferred place to measure impairments is somewhere in the middle of the transmission when the demodulator is performing at its best. To accomplish measurement at the preferred place in the middle of the transmission, measurements are kept for each block of a predetermined number of transmitted symbols. For example, measurements may be kept for each block of sequentially occurring groups of 200 symbols each. If the duration of the transmission is less than 4 seconds, the measurement block having the smallest overall noise power is reported to the microprocessor when the short duration transmission ends. The overall noise power provides a measure of good demodulator performance. For a given channel, the modem is performing its best when the overall noise power is the lowest.

If the transmission lasts more than 4 seconds in this example of the invention, the final measurements are computed as the average of the sample measurements reported to the microprocessor at regular intervals. The first set of sample measurements are reported to the microprocessor at the end of the 4th second. Thereafter, sample measurements continue to be reported periodically to the microprocessor, for example, at 5 second intervals.

Most of the measurements are available by the fourth second, but certain measurements are not reported until later. At the fourth second, the signal level, overall signal-to-noise ratio, frequency offset, attenuation distortion, and envelope delay distortion are reported. Timing offset may not be reported until later, for example, until the 9th second, because of a relatively slowly adapting feedback loop in a timing recovery algorithm used to supply the measurement. Values reported earlier may not be reliable. Amplitude modulation, phase modulation, and uncorrelated signal-to-noise ratio may be reported for the first time at the 14th second. These modulation measurements may require this additional amount of time because of the need for the processing elements to achieve steady state before those measurements can be considered reliable.

Adaptive processes in the demodulator 122 provide measurements of signal level, timing offset, amplitude distortion, envelope delay distortion, and frequency offset. The demodulator used to obtain these measurements, for example, may be similar to the fiemodulators found in standard modems in many respects. For example, the demodulator 122 may be similar to those demodulators found in standard V.29 and V.27 modems. However, steps which convert modem symbols to data bits are not carried out by the fiemodulator 122 because the actual bits in the page transmissions are not needed to obtain the desired analog impairment measurements. In an alternative embodiment, degradation can be measured by actually demodulating the page transmission and observing page quality by looking at certain aspects of the demodulated transmission such as scan line errors and the like.

FIG. 10 shows the main functional modules of the demodulator 122. An automatic gain control adjusts signal power to a desired level. The input PCM stream is converted from an 8 kHz to a 9.6 kHz sampling rate in this example of a demodulator. Timing recovery compensates for differences between the transmit and receive modem. A Hilbert transform is used to recover the in-phase and quadrature parts of the signal. An adaptive equalizer removes linear impairments from the signal. The output of the adaptive equalizer is then multiplied by a complex sinusoid at the carrier frequency. The carrier frequency is recovered by the phase locked loop.

More specifically, FIG. 10 shows that the PCM signal is directed to the input of an automatic gain control circuit 132 which amplifies or attenuates the PCM signal to provide a desired output level on line 134. The PCM signal from the automatic gain control circuit 132 is directed to the input of a sample rate converter 136 which changes the sample rate of the PCM signal so that it exactly is an integral multiple of the symbol rate or baud rate of the modem which is transmitting the PCM signal received by the circuit of FIG. 10. A timing recovery circuit 138 is responsive to the output of the sample rate converter 136 via an input line 140. The timing recovery circuit 138 is basically a control circuit which produces an output signal on line 142 which is used by the sample rate converter 136 to accurately synchronize the output of the sample rate converter 136 precisely to the symbol rate of the transmitting modem. The actual sampling rate at the output of the sample rate converter 136 in this example of the invention is, therefore, 9.6 kHz+e, where e is such that the rate at the output of the circuit 136 is a precise integral multiple of the rate of the transmitting modem. A Hilbert transform circuit 144 is responsive to the synchronized signal produced by the sample rate converter 136 to produce the in-phase and quadrature components of the quadrature amplitude modulated (QAM) page signals on lines 146 and 148. The in-phase and quadrature components are directed to two inputs of an adaptive equalizer 150. The adaptive equalizer 150 compensates for the amplitude and phase distortion added by the network to the PCM signals.

The outputs of the adaptive equalizer 150, decimated to the symbol rate of the known modem, are directed to two inputs of a multiplier element 156 which removes the in-phase and quadrature carrier waves from the PCM signal. A phased-lock loop circuit 158 receives the outputs of the multiplier element 156 on lines 160 and 162 and produces two outputs on lines 164 and 166 which are signals having frequencies which are the same as the actual carder frequencies of the signals directed to the inputs of the multiplier element 156 on lines 152 and 154. The frequency signals on lines 164 and 166 are used by the multiplier element 158 to demodulate the PCM signals on lines 152 and 154. The outputs of the multiplier element 156 on lines 168 and 170, which comprise demodulated in-phase and quadrature components of the input PCM signal, are directed to the inputs of the constellation analyzer 124. The outputs on line 168 and line 170 comprise the actual constellation of the transmitting modem. The constellation analyzer determines differences between the constellation as represented by the signals on lines 168 and 170 and an ideal constellation expected in light of the known modem characteristics.

Certain adaptive processes in the demodulator of FIG. 10 allow some of the in-service quality measurements to be derived. These measurements include signal level, timing offset, attenuation distortion, envelope delay distortion, and frequency offset.

Signal level is the power level of the input PCM signal. The signal level may be measured by observing two parameters in the automatic gain control process. The signal level is computed by dividing the average power of the AGC output by the square of the AGC gain. Both of these parameters are available as byproducts of any AGC operation. No additional computation is required. The signal level could also be measured directly at the input.

Timing offset is the slight difference between the transmit baud rate and the receive baud rate. This offset is most commonly caused by a difference between a reference clock in the receiver and a clock in the transmitting modem. The timing offset is measured from a velocity parameter of the timing recovery process. Timing may be recovered using a band edge timing recovery algorithm.

Attenuation distortion and envelope delay distortion are linear impairments related to deviations from an ideal channel response. Attenuation distortion is the deviation of the magnitude of the channel frequency response from being ideal, namely, a channel amplitude response which is flat. Envelope delay distortion is the deviation of the envelope delay of the channel response from being ideal, namely, a channel frequency response which is flat. Flat envelope delay is equivalent to linear phase response since envelope delay is defined as the negative derivative with respect to frequency of phase. The attenuation distortion and envelope delay distortion may be measured by examining the amplitude response of the adaptive equalizer filter, which has a characteristic which is the inverse of the channel response. The adaptive equalizer filter adjusts its amplitude and phase response to cancel the amplitude and phase distortions introduced by the network into the PCM signal. Thus the inverse of the frequency response of the adaptive equalizer provides an estimation of the frequency response of the channel. In order to provide measurements at the traditional frequencies used for measuring linear impairments, such as 1804 Hz and 1004 Hz, the channel response may be computed by Fourier transform techniques.

The frequency offset measurement is the measurement of a shift in the carrier frequency from its desired value. The frequency offset may be measured from a parameter in the phase-lock loop circuit 158 which recovers the carrier frequency.

The constellation analyzer 124 may measure signal-to-noise ratio, gain hits, phase hits, impulse noise, amplitude jitter, phase jitter, amplitude modulation, and phase modulation. All of these measurements are obtained by examining each output received from the demodulator 122 and comparing the location of each output to the location of the nearest ideal constellation point.

FIG. 11 shows in more detail the functional modules of the constellation analyzer 124. The outputs of the Cartesian demodulator 122 are directed to a circuit 172 on lines 174 and 176. The circuit 172 measures the overall signal-to-noise ratio of the signals produced by the demodulator 122. The overall signal-to-noise ratio is calculated by the circuit 172 as the ratio of the demodulator's output power to the power of an error signal. The error signal is the deviation of each demodulator output point from the closest ideal constellation point. The overall signal-to-noise ratio computed in this way gives a good indication of the likelihood that the transmitting modem is making bit errors. However, this measurement does not reveal whether or not the impairment faced by the modem is an uncorrelated impairment such as additive white noise or a correlated impairment such as frequency or phase modulation. The circuit of FIG. 11, therefore, also makes measurements which separate certain correlated impairments from uncorrelated impairments. Specifically, the circuit of FIG. 11 measures an uncorrelated signal-to-noise ratio similar to the measurement of overall signal-to-noise ratio. Some preliminary processing is performed on the constellation error signal to remove the effects of correlated impairments. In this regard, the output of the demodulator 122 is directed on input lines 178 and 180 to two inputs of a circuit 182 which computes the phase error and the magnitude error of the received constellation points with respect to their nearest ideal constellation points. The error computation circuit 182 produces two outputs on lines 184 and 186 which relate to the radial component of the difference between the received constellation point and the ideal constellation point and the angular component of the difference between the received constellation point and the ideal constellation point. The two signals on lines 184 and 186 are delivered on lines 188 and 190 to the inputs of a high pass filter 192, which may be configured to eliminate low frequency components below about 300 Hz from the phase and magnitude errors received from the error computation circuit 182. The cutoff frequency of the high pass filter 192 is set at a frequency such that the phase and amplitude modulation components in the error signals are removed. Typically, those components occur at frequencies below the 300 Hz cutoff frequency noted above. The high pass filter 192 produces filtered phase and amplitude error signals on lines 194 and 196 which are connected to the inputs of a second signal-to-noise ratio measuring circuit 198. The circuit 198 then computes an error power from the filtered phase error signal and the filtered amplitude signal. This power computation may then be scaled to replace the power of the white noise removed by the high pass filter. Because the uncorrelated signal-to-noise ratio measurement circuit 198 measures the signal-to-noise ratio only after removing phase and amplitude modulation, it provides a good indication of the presence or absence of additive white noise.

When the predominant impairment is uncorrelated noise, the overall signal-to-noise ratio measurement produced by the circuit 172 and the uncorrelated signal-to-noise ratio measurement produced by circuit 198 will be close in value. However, when the predominant impairment is amplitude modulation or phase modulation, the overall signal-to-noise ratio will be significantly worse (smaller) than the uncorrelated signal-to-noise ratio.

Since the demodulator's adaptive equalizer 150 removes noise outside the transmitted energy band, modems with transmitted energy in different frequency bands would report different signal-to-noise ratios for a given amount of additive noise. If the signal-to-noise ratio measurements are unscaled for this phenomenon, the signal-to-noise ratio measurements would result in different reported numbers for different modems even though the amount of noise is the same. To facilitate comparison between the relative quality of channels on which modems with transmitted energy in different frequency bands were observed, both the overall signal-to-noise ratio measurement and the uncorrelated signal-to-noise ratio measurement are scaled to reflect the signal-to-noise ratio that would have been measured had the transmitted energy been in a frequency band which is 2400 Hz wide, which is the width of the frequency band transmitted by a V.29 modem. The scaling assumes that the noise is evenly distributed across such 2400 Hz wide frequency spectrum.

In addition to the circuits described above, the circuit of FIG. 11 contains a number of devices which measure transient impairments which are not stationary in time. These impairments include impulse noise, gain hits, and phase hits. Transient impairments are measured by counting the number of transient events or "hits" which occur during an observation period. The number of hits counted has a useful meaning only in the context of the observation time. For example, a hit occurring during a one second time period has a meaning which is different from that of one hit occurring in a 100 second time period. Longer observation times allow one to make reasonable assessments of the extent to which hits are appearing at regular intervals in facsimile transmissions.

Two parameters are used in this example of the invention to implement the transient measurements. They are qualifying time and blocking time. Qualifying time is how long a transient impairment must exist before it qualifies as a hit. There is no qualifying time used for impulse noise measurements. Examples of qualifying times for gain hits and phase hits may be about 5.0 msec. for V.27 transmissions and about 2.5 msec. for V.29 transmissions. It should be noted that modems which produce more complicated constellations than those produced by V.27 and V.29 modems require shorter qualifying times because spatial aliasing will cause the impairment to appear to persist only for a few symbols at a time. Blocking time is the amount of time after a hit has been counted during which a new hit cannot be counted. For all of the transient measurements, the blocking time may be about 125 msec. Thus, in a given second no more than 8 hits of a transient impairment will be counted.

Figure 12:
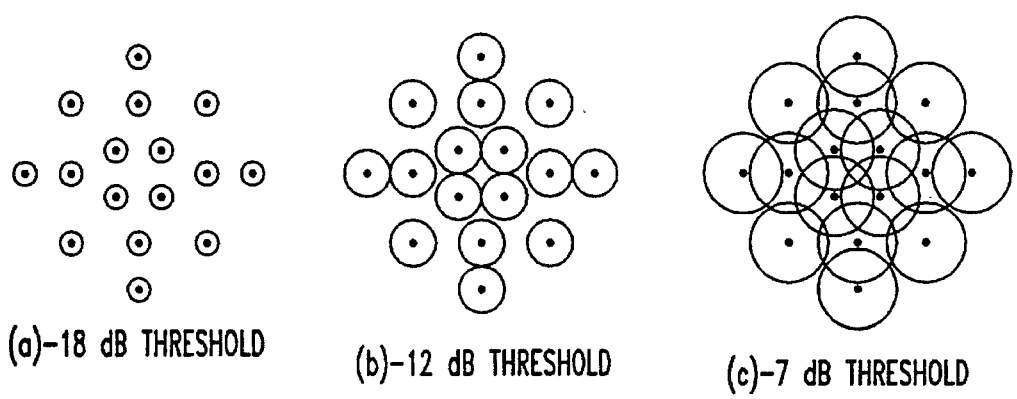

A measurement circuit 200 in FIG. 11 receives the demodulator output on a pair of input lines 202 and 204. The measurement circuit 200 measures impulse noise in the demodulator outputs. The measurement circuit 200 compares the instantaneous power of the error of each demodulator output to the average power of the constellation currently being received. The ratio of the error power and the average power is related to the impulse noise. Impulse noise measurements may be referred to a number of different severity levels. In this example of the invention, impulse noise is referred to three levels of severity, for example, −7 dB, −12 dB, and −18 dB. FIGS. 12a to 12c show circles corresponding to these thresholds as applied to a V.29 9600 bit per sec. constellation. If a demodulator output does not lie within any of the circles associated with a particular threshold, then an impulse noise hit is counted. To qualify as an impulse noise hit, a demodulator output must fall outside of all 16 circular regions associated with that threshold. It should be pointed out that −7 dB impulse noise on the inner constellation points, as shown in FIG. 12c, will not be accurately measured because the threshold circles overlap. If the error in the demodulator output is bad enough to exceed the −7 dB threshold, then the error is bad enough to cause the demodulator output to be mistakenly associated with the wrong constellation point. This phenomenon is known as spatial aliasing. For large errors in the demodulator output, spatial aliasing degrades measurement accuracy. In these situations, measurements of only the outer constellation points may be advisable.

In FIG. 11, a measurement circuit 206 receives the output of the phase and magnitude error measurement circuit 182 on lines 208 and 210. The measurement circuit counts the number of gain hits and phase hits in the modem transmission. Gain and phase hits are measured by examining the magnitude errors and the phase errors of the demodulator outputs. Gain hits are counted when an increase or decrease in power level of a predetermined amount persists for more than the qualifying time. For example, a gain hit may be counted when the power level increases or decreases by about 1 dB or more with respect to the power of the closest ideal constellation point and persists for more than the specific qualifying time referred to above. Phase hits are counted when phase deviations of more than a predetermined amount occur for longer than the qualifying time. For example, phase hits may be counted when there is a phase deviation of greater than about 7° with respect to the phase of the closest ideal constellation point for a period of time equal to the specific qualifying time referred to above. In the cases of both gain hits and phase hits, the hit counter of interest must not be in a blocking period for it to be incremented by the occurrence of these gain and phase deviations.

The phase and magnitude error computed by the circuit 182 are also directed on lines 212 and 214 to the inputs of an amplitude and phase jitter measurement circuit 216. Amplitude jitter is the magnitude component of the constellation error and phase jitter is the phase component of the constellation error. Although these measurements may be made for all transmissions, it is preferred that they be made only during a short period at the beginning of the transmission, for example, during the first 4 seconds of the transmission. These amplitude and phase jitter measurements are most useful for modem transmissions which are too short for performing accurate amplitude modulation and phase modulation measurements described below. The measurement circuit 216 first calculates amplitude jitter by computing the mean square gain error of the demodulator output. This computed number then is scaled to give the percent of amplitude modulation which would produce the computed mean square gain error. Phase jitter is computed by the measurement circuit 216 as the mean square phase error of the demodulator output. This number is also scaled to give the peak-to-peak degrees of phase modulation which would produce the observed phase error. The mean square phase error may be computed from the phase error observed in the phase locked loop of the demodulator described above. The phase error could also be computed directly from the received constellation points.

The circuit of FIG. 11 also computes certain amplitude and phase modulation characteristics of the demodulator output. Amplitude and phase modulation measurements indicate the severity of certain correlated magnitude errors and correlated phase errors in the demodulated output. To remove uncorrelated components from measured impairments, the magnitude error and phase error signals produced by the error computation circuit 182 are directed to two inputs of an adaptive predictive filter circuit 218 which removes the nonpredictive components of the error signals from the computation circuit 182. The outputs 220 and 222 of the adaptive predictive filter 218 are then processed by a first band pass filter 224 and a second band pass filter 226. The outputs of the band pass filters 224 and 226 provide some information about the spectrum of the phase and magnitude error modulations which can give some indication about the source of the errors. For example, modulation of the magnitude error at a frequency of 60 Hz and its harmonic frequencies may indicate power line interference with the facsimile transmission being monitored. As shown in FIG. 11 the band pass filter 224 has a pass band from about 4 Hz to about 20 Hz. The band pass filter 226 has a pass band from about 20 Hz to about 300 Hz. A peak detector 228 and a peak detector 230 measure the severity of the modulations indicated by the outputs of the band pass filters 224 and 226, respectively. Amplitude modulations are determined by measurement circuits 232 and 234 in percent gain. Phase modulations are measured in peak-to-peak degrees by the measurement circuits 232 and 234.

This completes the description of the circuitry which derives the information needed to create the event stream produced by the integrate and arbitrate circuit 74. The event stream may include signals representing the occurrence of the start of a facsimile call, the end of a facsimile call, 1100 Hz or 2100 Hz tones at the beginning of a facsimile call, demodulated V.21 messages, V.29 or V.27 trial transmissions and page signals, with and without ISQM measurements, and nonfacsimile events occurring during the call. The event stream may include time stamps for each event, the duration of some events, and the energy in some events. The event stream produced by the integrate and arbitrate circuit 74 in FIG. 8 is directed on a line 121 to the input of a diagnostic circuit shown in FIG. 13, which is located in the computer 35. A block 236 causes the circuit of FIG. 13 to wait for the next event in the event stream. A block 238 determines if the next event is the start of a call. If there is no start of call as indicated by block 238, the operation of the circuit of FIG. 13 returns to the input of the block 236. At the start of a call, as indicated by block 238, the circuit of FIG. 13 initializes a call summary in block 240. The call summary is a group of data and measurements which are produced during the course of a facsimile call. The call summary may comprise information about whether the call was a facsimile call, a voice call, or other kind of call. The call summary may also comprise information about the kinds of activities that took place in a facsimile call as well as certain performance measurements associated with the call. The information in the call summary is updated periodically as the call progresses.

Figure 13:
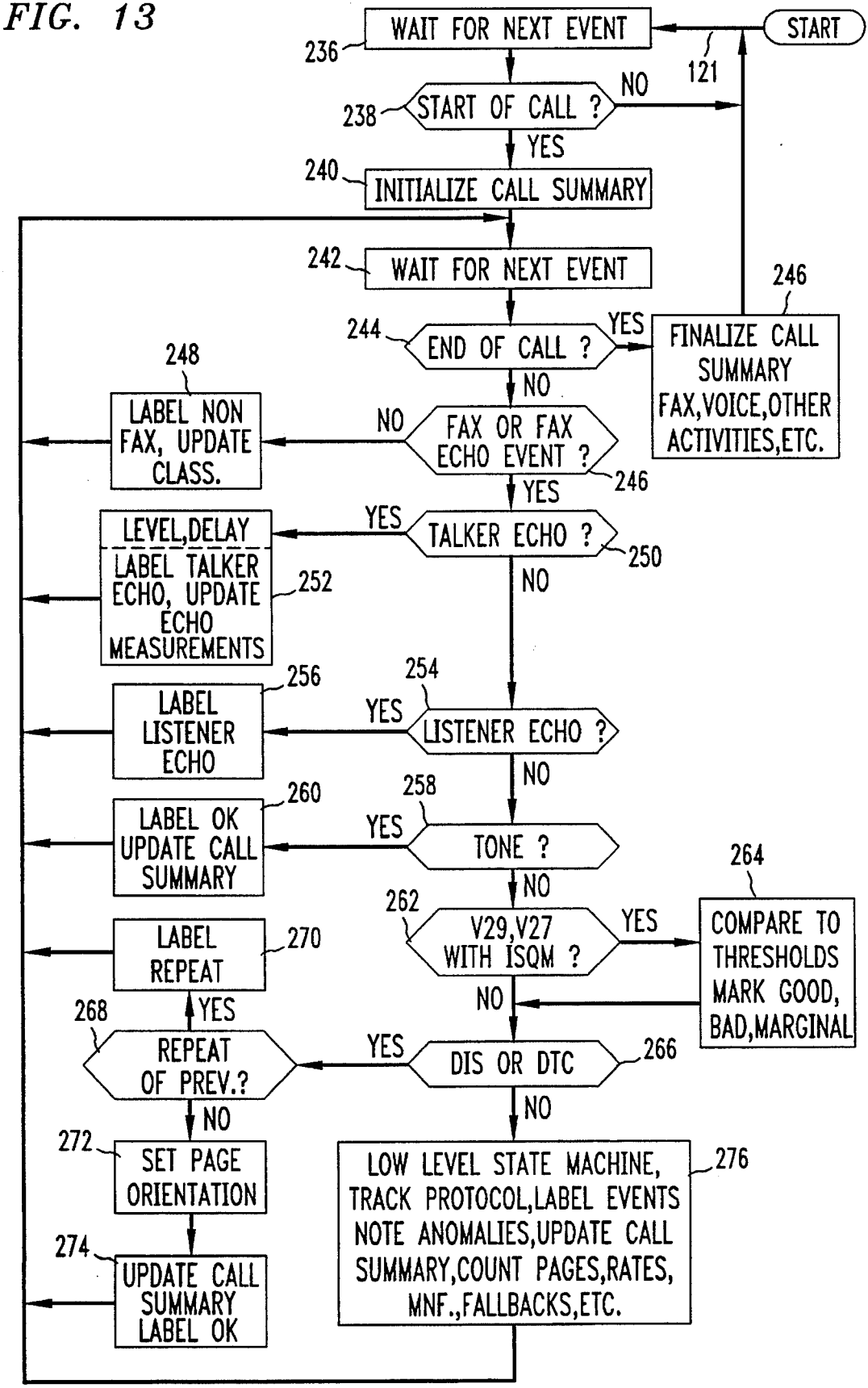
FIG. 13 is a flow chart specifying circuitry in the computer shown in FIG. 2 for accomplishing diagnosis of facsimile transmissions received by facsimile analysis equipment in accordance with this invention.

After the call summary has been initialized in block 240, the circuit of FIG. 13 waits for the arrival of the next event from the integrate and arbitrate circuit 74 as indicated by block 242. When the next event arrives, block 244 makes a determination of whether or not the next event constitutes the end of the call. If the next event is the end of the call as determined in block 244, then the call summary is finalized in block 246. If the next event, as determined in block 244, is not an end-of-call event, then a determination is made in block 246 as to whether the event is one which is part of a facsimile call or an echo of such an event. If it is found that the event is a nonfacsimile event, it is labeled as such in block 248 and a signal classification designation is updated. The operation of the circuit of FIG. 13 then returns the input of block 242 and repeats the operation of the circuit from that point.

If block 246 determines that the event is a facsimile event or an echo of a facsimile event, then block 250 makes a determination as to whether or not the event was a talker echo event. If block 250 finds that the event was a talker echo event, then it is labeled as such in block 252 and echo measurements are updated accordingly. Specifically, the level of the echo event as compared with the level of the primary event which produced the echo and the time delay between the appearance of the primary event and the appearance of the corresponding talker echo event is noted in block 252. The operation of the circuit of FIG. 13 then returns to the input of block 242. If the determination in block 250 is that the event is not a talker echo event, then block 254 makes a determination as to whether or not the event is a listener echo event. If the event is a listener echo event, block 256 labels it as such in the operation of the circuit of FIG. 13 returns to the input of block 242.

If the event is not a listener echo event as determined in block 254, then the circuit of FIG. 13 makes a determination in block 258 as to whether or not the event is a tone. If the event is a tone, the event is labeled satisfactory and the call summary is updated with an indication that a specified tone was found in the facsimile call in block 260. The operation of the circuit of FIG. 13 then returns to the input of block 242.

If the event was not a tone, as determined in block 258, then the circuit of FIG. 13 makes a determination in block 262 as to whether or not the event is a V.29 or a V.27 event having in-service quality measurements appended to an indication of the occurrence of the event. If the event is a V.29 or a V.27 event with appended in-service quality measurements, then the measurements are compared in block 264 with a set of thresholds. The thresholds are predetermined signal levels determined empirically or by some other means indicating values of the ISQM measurements expected for a properly performing network handling facsimile traffic produced by properly performing facsimile equipment for a network and facsimile equipment connected to the network. Block 264 characterizes the in-service quality measurements with respect to the thresholds in a plurality of ways. As indicated in FIG. 13, the in-service quality measurements may be labeled as good, bad, or marginal depending on how they compare with the levels of the thresholds.

If the event from the circuit 74 is not a V.29 or V.27 signal with ISQM, or if the operation of block 264 has been performed by the circuit of FIG. 13, a determination then is made in block 266 to see if the event is a V.21 digital information signal (DIS) or a digital transmit command (DTC) signal. If the yes path on the output of block 266 is followed, then a determination is made in block 268 as to whether or not the event was a repeat of a previous DIS or DTC event. If the event is such a repeat, then it is labeled as such in block 270 and the operation of the circuit of FIG. 13 returns to the input of block 242. If the event was not a repeat, as determined in block 268, a page orientation parameter is set in block 272, the call summary is accordingly updated in block 276, and the operation of the circuit of FIG. 13 returns to the input of block 242.

If block 266 determines that the event does not involve a DIS signal or a DTC signal, a low level state machine 276 then tracks the protocols in the facsimile transmission, labels the occurrence of certain events in the facsimile transmission, notes any observed anomalies such as failures of modems to train, and further updates the call summary with information such as page counts, data rates, manufacturers, identifications, fall backs, retraining, durations of transmissions, and errors in page transmission.

Figure 14:
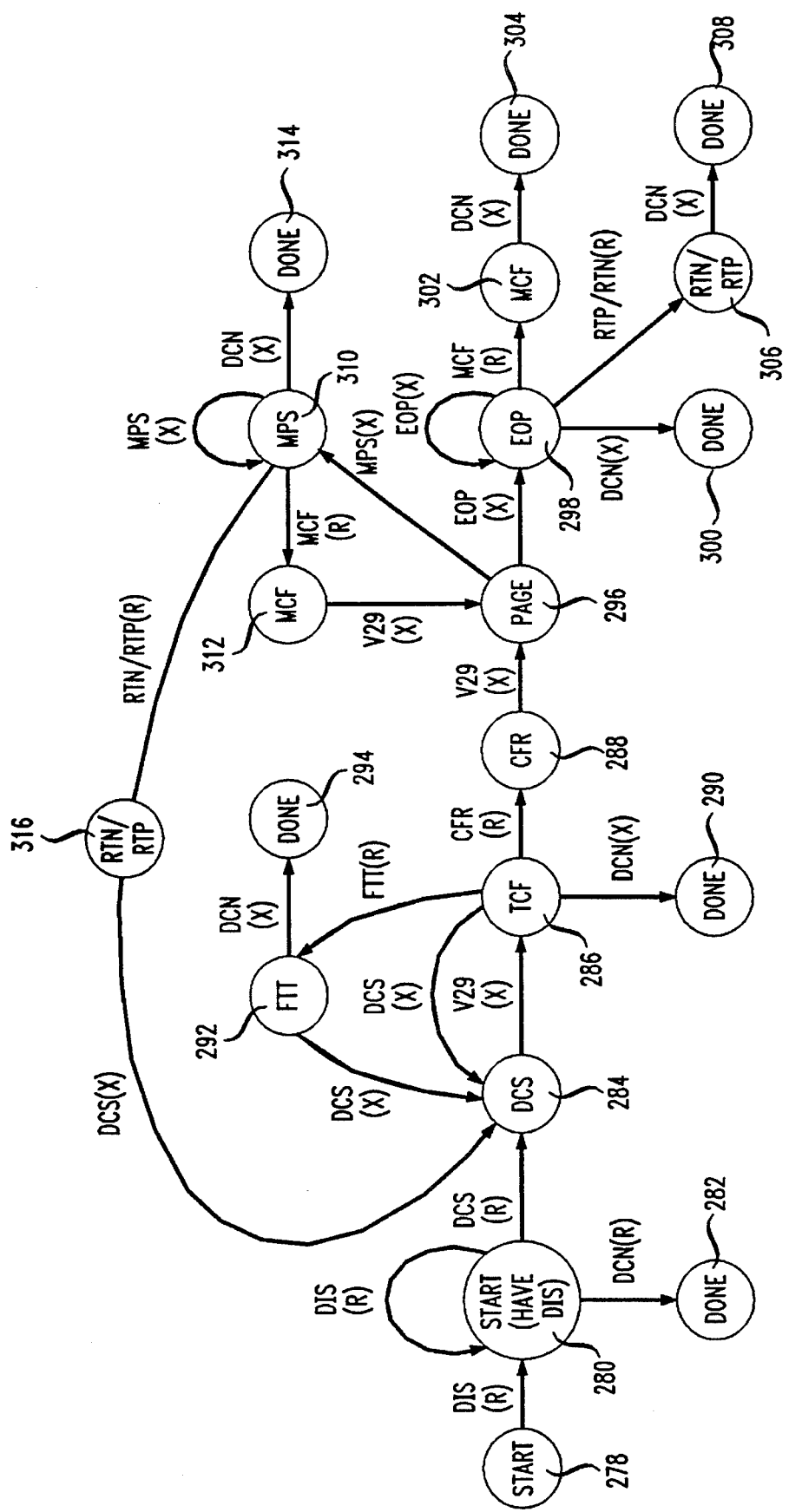
FIG. 14 is a state diagram illustrating an example of the operation of the state machine of FIG. 13 for a typical G3 type facsimile transmission without an error correction mode.

FIG. 14 illustrates a diagram of some of the states which may be entered into by the low level state machine 276 of FIG. 13 in response to an example of a typical G3 facsimile call. The state machine 276 begins at an initial state 278. Detection of the receiver sending to the transmitter a digital identification signal DIS(R) in accordance with the T.30 protocol, causes the state machine 276 to enter into a start state 280 which reflects the fact that a DIS signal was detected. Continued DIS messages from the receiver cause the state machine 276 to remain in the start state 280. Eventually, continued sending of unanswered or improperly answered DIS messages from the receiver will cause the receiver to terminate the call by sending a disconnect DCN(R) signal and the state machine 276 will then enter a done state 282.

The next proper signal normally present in a G3 facsimile call after the receiver sends a DIS signal is a digital command signal DCS sent by the transmitter to the receiver, identified in FIG. 14 as a DCS(X) signal. Sending of a DCS signal from the transmitter to receiver causes the state machine 276 to enter a DCS state 284 indicative of the sending of a DCS signal from the transmitter to receiver. The next proper signal in a G3 facsimile call is a trial transmission which may be a V.29 transmission from the transmitter to the receiver identified as V.29 (X), as shown in FIG. 14. The state machine 276 then enters a training check (TCF) state 286 because the first such V.29 signal will be a training sequence from the transmitter to the receiver.

Proper reception of a training sequence by the receiver causes the production of a confirmation signal CFR(R) sent by the receiver to the transmitter and entry of the state machine 276 into a confirmation (CFR) state 288. A disconnect DCN(X) signal from the transmitter causes the state machine to enter a done state 290.

If there is an improper reception of the training sequence, the receiver produces a failure to train signal FTT(R) and the state machine 276 enters a failure to train (FTT) state 292. A disconnect signal DCN(X) from the transmitter at this time causes the state machine to enter a done state 294. The occurrence of a digital command signal DCS(X) from the transmitter when the state machine is in state 292 or state 286 causes the state machine to reenter state 284.

After confirmation of proper receipt of the training sequence and entry of the state machine into state 288, a page signal is sent from the transmitter to the receiver. As shown in the example of FIG. 14, the page signal may be a V.29 signal. In response to the presence of the V.29 signal, the state machine 276 enters a page state 296. If the facsimile transmission involves sending only a single page to the receiver, the transmitter sends an end of procedure signal EOP(X) to the receiver at the completion of the page signal and the state machine 276 enters an end of procedure EOP state 298. Continued sending of end of procedure signals to the receiver results in the state machine 276 remaining in state 298. Production of a disconnect signal DCN(X) by the transmitter results in the state machine entering a done state 300.

If the receiver properly receives the page signal and the EOP signal from the transmitter, the receiver sends a message confirmation signal MCF(R) to the transmitter and the state machine 276 enters a message confirmation MCF state 302. A disconnect signal from the transmitter to the receiver DCN(X) when the state machine is in state 302 causes the state machine to enter a done state 304. When the state machine 276 is in the end of procedure state 298, a retrain positive signal or a retrain negative signal RTP/RTN(R) from the receiver to the transmitter causes the state machine 276 to enter an RTN/RTP state 306. A disconnect signal from the transmitter to the receiver DCN(X) when the state machine is in state 306 causes the state machine to enter a done state 308.

If the facsimile transmission involves more than one page, the transmitter sends to the receiver a multipage signal MPS(X) when transmission of each page has been completed. The state machine 276 in this situation enters a multipage signal MPS state 310 from the page state 296. Continued sending of a multipage signal from the transmitter to the receiver causes the state machine 276 to remain in the MPS state 310 as shown in FIG. 14. If the receiver has properly received the multipage signal from the transmitter, the receiver sends a message confirmation signal MCF(R) to the transmitter and the state machine 276 enters a message confirmation state 312. The transmitter then sends the next page in the transmission, for example, the transmitter sends the next page by a V.29 transmission as indicated in FIG. 14. The state machine enters the page state 296 in response to this page transmission. The state machine loops between states 296, 310, and 312 as each page is properly transmitted and received in the course of the facsimile transmission. The production of a disconnect signal from the transmitter to the receiver causes the state machine to enter a done state 314 from state 310. If the receiver sends a retrain negative signal or a retrain positive signal RTN/RTP(R) to the transmitter in the course of a page transmission, the state machine 276 enters an RTN/RTP state 316 shown in FIG. 14. A digital command signal DCS(X) from the transmitter to the receiver causes the state machine 276 to re-enter the DCS state 284 from state 316.

The states which were entered into by the state machine during the course of a facsimile transmission are recorded for use in producing characterizations and diagnoses of the facsimile transmission observed by a facsimile measurement apparatus in accordance with this invention.

Figure 15:
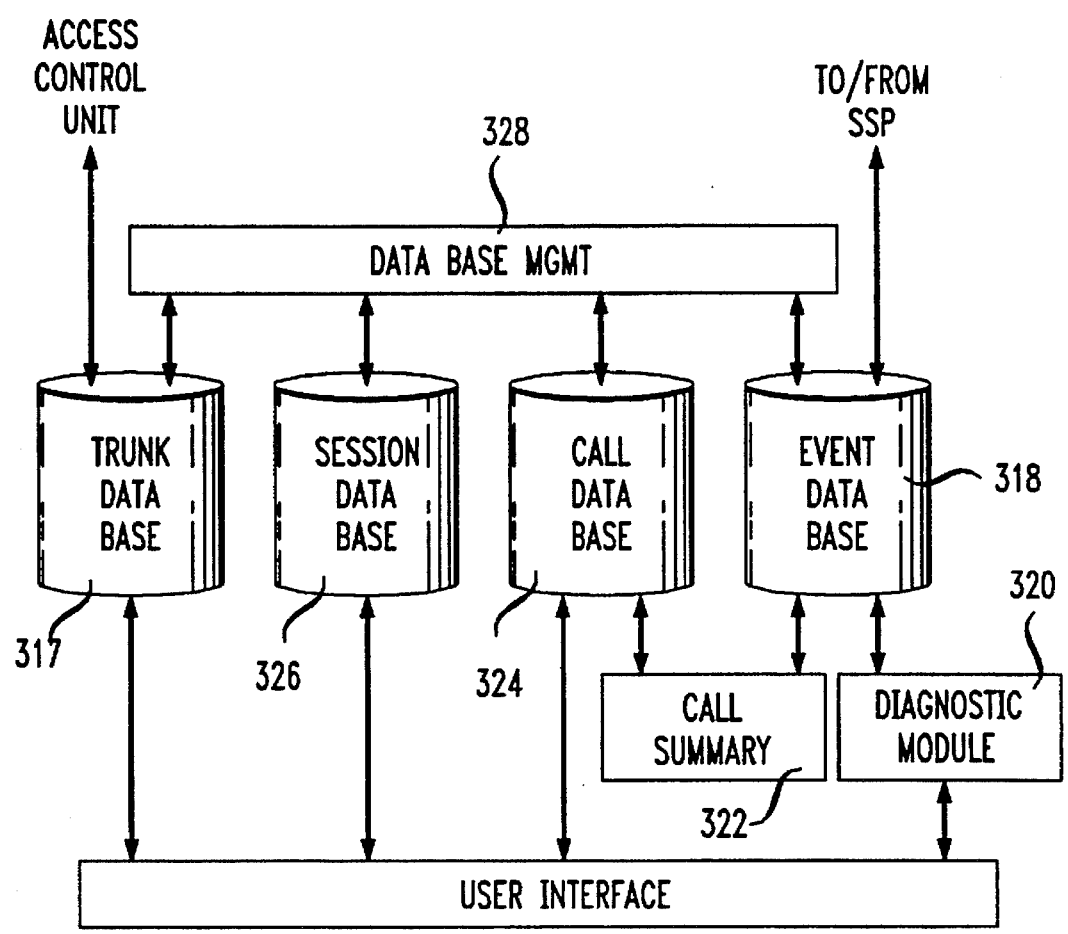
FIG. 15 is a block diagram illustrating the database architecture in the computer of FIG. 2.

FIG. 15 illustrates the data base architecture in the computer 35 shown in FIG. 2. The apparatus of FIG. 15 includes a trunk database 317 which is connected to the access control unit 40. The trunk database 317 contains relevant information about all the trunks being processed by the network node 42. This information may include some identification number for each trunk and the geographical areas served by each trunk. For call or session control, the trunk database 317 will be accessed and commands will be issued to the access control unit 40 from the trunk database 317 requesting the monitoring of specific portions of the communications traffic through a network node as described above. As described in the example above, both directions of a selected call represented by two DS0's will be placed on two adjacent DS0 time slots of a DS1 bit stream flowing between the network node 42 and the access control unit 40. These two adjacent time slots are tapped by the service signal processor 34 by means of the bridging repeater 48.

The database architecture of FIG. 15 also contains an event database 318 which is responsive to signals produced by the service signal processor 34. The database 318 collects and stores representations of the specific events observed by the service signal processor 34 in the course of monitoring one or more facsimile calls. A diagnostic module 320 is responsive to the contents of the event database 318 and determines if there are any abnormalities in the calls observed by the facsimile measurement apparatus. The diagnostic module 320 tracks the protocol events occurring on both directions of each fax call. The diagnostic module 320 generates appropriate information about the nature of the fax call which can be called up on the user interface. The diagnostic module 320 contains templates of normal facsimile calls which are compared to the events occurring in an actual call. Exceptions to normal operations in the facsimile protocols are noted and may be appropriately displayed on the user interface 36 along with the results of the nonintrusive impairment, echo, and delay measurements described in more detail above. When a facsimile call has been completed, the diagnostic module 320 uses the information collected about measurements and events to render an overall decision about the reason for the occurrence of an abnormal facsimile call. For example, the diagnostic module 320 may indicate that an abnormal call was caused by an undue amount of echo or noise or that there was some protocol incompatibility between the sending and receiving facsimile machines. The diagnostic module may summarize the results for the user and may send appropriate data to a session database and a call database described below.

In addition to the diagnostic module 320, the circuit of FIG. 15 contains a call summary module 322 which organizes certain information about every facsimile call observed by an apparatus in accordance with this invention. The call summary is a collection of data indicating certain normal and abnormal behavior of each observed facsimile transmission. The data in the call summary may be used for subsequent analysis and traffic characterization. A call summary may contain the following illustrative information:

1. The number of pages in the incoming and outgoing directions;
2. Information about the manufacturers of the machines used in the facsimile call;
3. Information about the geographical areas involved in the facsimile call;
4. Information about the numbers of pages transmitted at each of a plurality of bit rates, for example, 9600, 7200, 4800, and 2400 bits per second;
5. The speed of the first trial or training transmission;
6. The speed of transmission of the first page;
7. The average page duration at each of a plurality of bit rates, for example, 9600, 7200, 4800, and 2400 bits per second;
8. The number of retrains before the transmission of the first page;
9. The number of retrains after the transmission of the first page;
10. An indication of the presence of a turnaround, specifically an indication of whether the receiving facsimile machine was requested to send pages to the transmitting facsimile machine;
11. An indication of whether an error correction mode was used, for example, a T.30 error correction mode;
12. An indication of the existence of partial page transmissions;
13. Indications of the presence of an echo protection tone, an auto-originate tone, or an auto-answer tone;
14. An indication of normal and abnormal terminations of the facsimile transmission; and
15. The results of call diagnostics, for example, the results of protocol tracking and in-service quality measurements and the results of comparison of those results to a set of predetermined expected measurements.

Information such as the information described above is accumulated by the call summary module 322 for each call during a monitoring session. A call database 324 stores the call summaries produced by the call summary module 322. When this apparatus is used in a directed access mode, this information is collected for the specific call which is being monitored. A session summary will be accumulated for all calls in a given session. Further summaries may also be accumulated for selected items at the trunk, trunk sub-group, and geographical region level.

A session database 326 contains a superset of the information in the call database, specifically, the session database 326 contains information regarding monitoring sessions occurring over a predetermined time which may encompass more than one facsimile call. The operation of the databases 317, 318, 324, and 326 are controlled by a database management module 328. The contents of the databases and the output of the diagnostics module 320 may be displayed to a user via a user interface described in more detail below.

The details of the user interface 36 are illustrated by a series of representations of various screens which may be produced on a monitoring device connected to the computer 35 shown in FIG. 2. These representations are shown in FIGS. 16–25. There are two display modes, each respectively associated with the previously described monitor mode and directed access mode. There is also a retrieval display mode in which certain data collected in the past and now stored in the databases described above may be retrieved for display to a user of an apparatus in accordance with the principles of this invention.

In the monitor display mode, the user may request monitoring of all calls made during a predetermined time period on a specific portion of the communications channels handled by the network node 42. The monitoring for a predetermined time is referred to as a session. The user will be able to view measurements and statistics about each call as it passes through the network node 42. These measurements and statistics may be displayed on a computer screen as they are generated in real time during the course of each call. In addition to displaying information about an ongoing facsimile call as it takes place, the user may also request and a view overall statistics for some or all the prior calls measured to date during the session. In the directed access mode, where access to a particular facsimile call is set up in response to a specific customer request, the user normally will view the events associated with that call as it progresses in real time. The events may also be saved for later display. In the analysis mode, the user can retrieve data from any past measurement session and can either display information in a manner similar to that of the display of live calls or the user can view a series of report summaries about the measurement sessions.

The user interface 36 will make available to the user a menu from which the specific mode of operation can be selected. Specifically, a computer screen connected to the computer 35 may display the options of looking at data from a monitoring mode or a directed test access mode. The computer 35 may also indicate the availability of an access or retrieval mode. FIGS. 16–25 illustrate the behavior of the user interface in the retrieval mode which illustrates the entire capability of the user interface. Operation in the other modes are essentially similar and are not described here.

Figure 16:
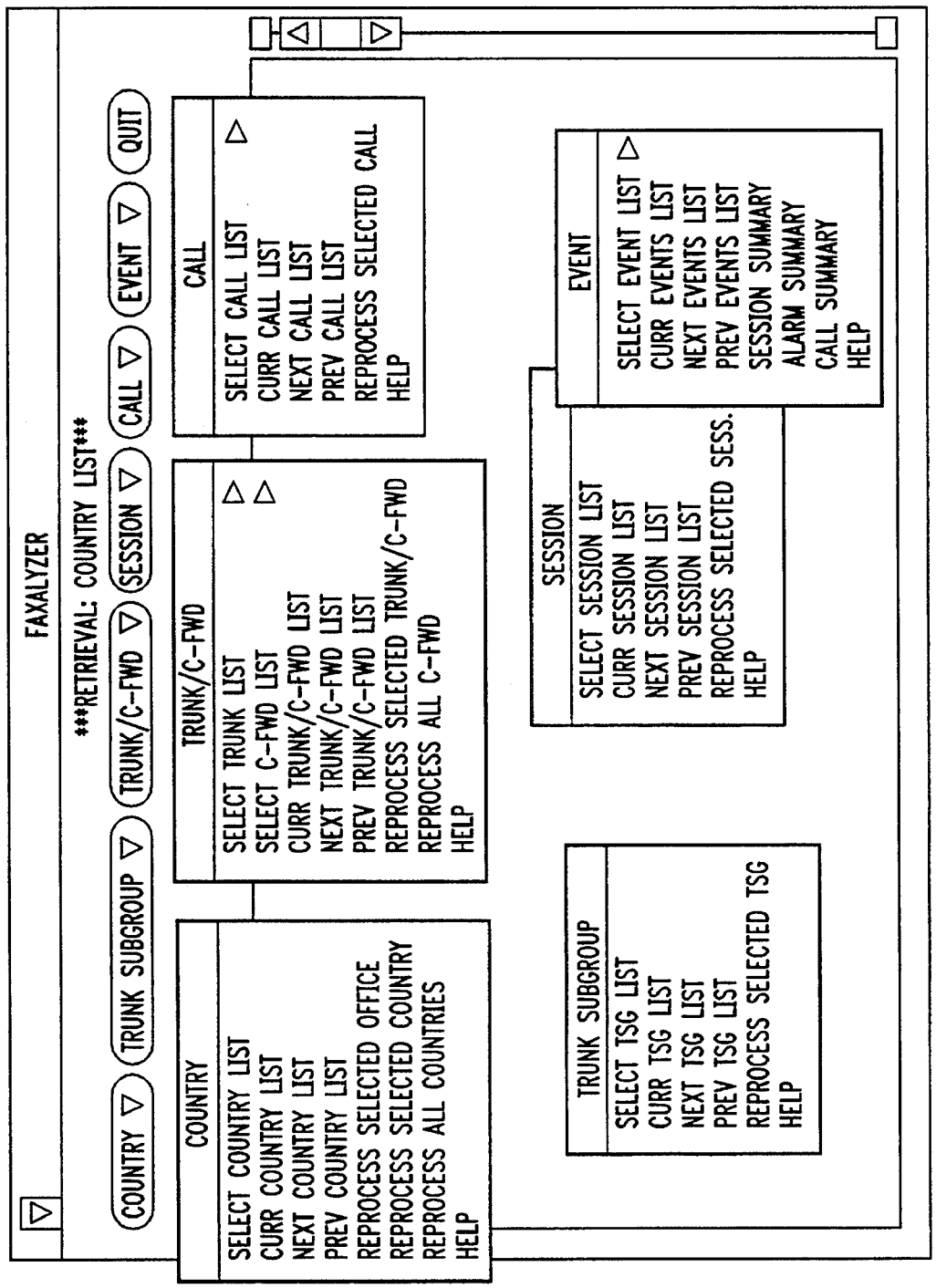
FIG. 16 illustrates an example of a menu of options available to a user of a facsimile measurement apparatus in accordance with this invention.

If the user selects the retrieval mode, he is given the opportunity to select the display of certain categories of information, as shown in FIG. 16. The user may select to display information about facsimile calls directed to one or a number of geographical areas, for example, the user may elect to display data about facsimile calls to a certain country or to display data handled by a certain trunk sub-group which may handle facsimile calls to a certain city within a country. As shown in FIG. 16, the user may also elect to observe the facsimile calls made on a particular trunk, in this case, the user may elect to observe the calls made on a predetermined DS0 handled by the network node 42.

Selection of a particular country in the example shown in FIG. 16 will cause the display to produce a list of countries and cities such as the list shown in FIG. 17. FIG. 17 comprises a menu of options from which the user can select a country or city to observe. A facsimile measurement apparatus in accordance with this invention will provide information about the nature of the facsimile traffic to that country and city.

FIG. 18 shows a list of trunks which comprise a selected trunk sub-group from the menu of FIG. 17. The screen of FIG. 18 shows in the far right hand column the number of sessions stored in the facsimile analysis equipment for which data has been taken for each listed trunk. The user may then select for observation the results of measurements on trunks indicated in FIG. 18 as having had one or more monitoring sessions.

Figure 19:
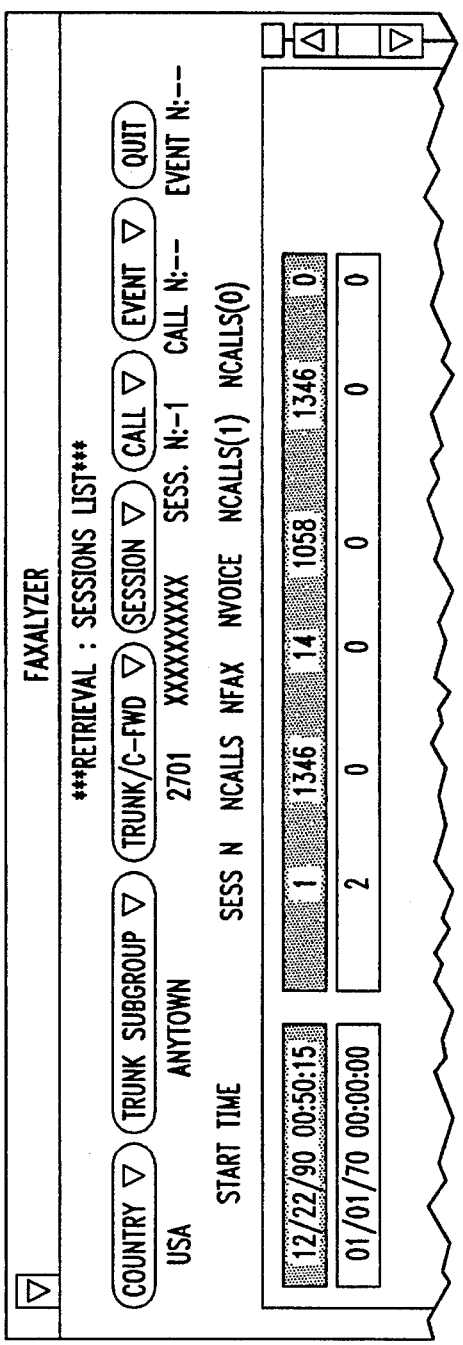
FIG. 19 is an example of a session list available to a user of a facsimile measurement apparatus in accordance this invention.

FIG. 19 shows an example of a sessions list which can be produced in response to selection from the list of FIG. 18 of a trunk for which measurements have been taken and stored in the facsimile analysis equipment. The sessions list of FIG. 19 identifies the start time of the session, a session number, the number of calls monitored during the session, and the number of calls which were facsimile calls. Further information about a session listed in a sessions list like the one in FIG. 19 may be produced in a sessions summary such as the one shown in FIG. 20. Among other things, the session summary identifies certain characteristics of the session and the calls within the session. The session summary also identifies certain diagnostic and statistical aspects of the measurements made on the facsimile calls made during the session. As indicated in FIG. 20, certain percentages of the calls have been identified as good, marginal, and bad as indicated by the columns headed by these designations. The session summary may also indicate tabular data relating to numbers of pages and a time duration of transmission at specified rates.

The user interface 36 may also produce a display of a call list which basically identifies the start time of each call in the session, identifies each call with a number, identifies the number of measured events in each call, characterizes the type of each call, and gives an indication of the duration of each call during a session. See FIG. 21. The call list may include information for every call which was observed during the monitoring session or the non-facsimile calls may be filtered from the list as they have been in FIG. 21.

The user may call up a display of further information about selected ones of the calls listed in the call list of FIG. 21. In this regard, the previously described call summary for the selected call may be displayed, one example of which is shown in FIG. 22. The information in FIG. 22 is self-explanatory in light of the discussion of call summaries above and, therefore, is described no further here.

The user interface 36 of a facsimile measurement apparatus in accordance with the principles of this invention also permits a user to display a list of the observed events which had occurred in each measured facsimile transmission. FIG. 23 shows such a list for the call summary illustrated in FIG. 22. Each event is numbered and the time of occurrence for each event is noted near the left hand margin of the display shown in FIG. 23. As indicated by the nonconsecutive event numbering in the far left hand column of FIG. 23, some of the call events have been filtered from the display. Those events filtered from the display of FIG. 23 may include some idle events and activity events caused by noise and the like which can be ignored as irrelevant artifacts in the facsimile transmission. The display shown in FIG. 23 also indicates whether or not each event was produced by the transmitting facsimile machine or the receiving facsimile machine. The events produced as a result of transmissions from the receiver to the transmitter are listed in a column headed by the word "incoming". The events produced as a result of transmissions from the transmitter to the receiver are listed in a column headed by the word "outgoing." For each event, the display of FIG. 23 indicates the signal level of the transmission and the kind of event which took place, for example, there is a display of the fact that the event was the result of a V.21 HDLC transmission, a V.29 9600 or 7200 bps page or training transmission, or a V.27ter 4800 bps page or training transmission.

FIG. 23 also indicates some of the content of the protocol messages for the V.21 events and also indicates whether the V.29 and V.27ter are page or trial transmissions. The display of FIG. 23 also contains diagnostic information deduced by the facsimile analysis equipment. This diagnostic information can include some indication of the signal level and quality of each transmission which produces the observed events. The event numbered 25 at the top of list in FIG. 23 was a V.21 HDLC transmission from the receiver to the transmitter in accordance with the T.30 protocol having a signal level of −17.20 dBm. The event 25 was identified by large circuitry associated with the V.21 demodulator 106 described above as a properly transmitted protocol message involving a called subscriber identification CSI and a digital identification signal DIS from the receiver to the transmitter. Event 25 is accordingly labeled OK. The box surrounding the information about event 25 in FIG. 23 may be colored with a suitable color indicating that the transmission was proper. For example, the box may be colored green. Event 28 was the result of a proper V.21 HDLC protocol transmission from the transmitter to the receiver involving a digital command signal DCS and is labeled OK. Event 28 indicates that the transmitter will send page data to the receiver at 9600 bps. As in the case of event 25, event 28 may be colored green. Event 29 indicates that the transmitter next sent a V.29 9600 bps trial transmission TCF to the receiver. The SNR designation indicates that the in-service quality monitor found that the signal-to-noise ratio was bad during the trial transmission. The box surrounding the information about event 29 may be colored in a manner indicating that the event was bad, for example, event 29 may be colored in red. Event 32 was a V.21 HDLC transmission from the transmitter to the receiver repeating the digital command signal of event 28. Event 32 is labeled as a repeat CMD REPEAT of a prior command which may be considered a marginal event. Marginal events such as event 32 may be given a suitable color such as yellow. Event 34 is an attempt to repeat the training transmission of event 29 since there was no response from the receiver. Again, the transmission was bad and an indication is placed next to event 34 that this was not the first transmission which was bad. Again, a bad event like event 34 is colored red. Event 38 is a V.21 HDLC transmission from the receiver to the transmitter indicating that there was a failure to train FTT. Failures to train such as event 38 are considered marginal at this point and event 38 accordingly is colored yellow. Event 38 is also indicated by the diagnostic module to have resulted from a bad training sequence BAD TCF. Event 41 is a V.21 HDLC transmission from the transmitter to the receiver involving a digital command signal DCS notifying the receiver that the transmitter will fall back to a transmission rate of 7200 bps for the trial transmission. Event 41 is labeled OK and maybe colored green. Event 44 is a V.29 7200 bps trial transmission from the transmitter to the receiver for which the in-service quality monitor has indicated a marginal rating. Event 44 is indicated as not being the first marginal transmission and is colored yellow. Event 47 is a V.21 HDLC transmission from the receiver to the transmitter involving a confirmation CFR of the receipt of the trial transmission of event 44. Event 47 is labeled OK and maybe colored green. Event 50 is a V.29 7200 bps page transmission from the transmitter to the receiver. ISQM measurements indicate that the page transmission was bad due to poor signal-to-noise ratio. Event 50 accordingly is labeled as not being the first bad transmission and may be colored red. Event 55 is a V.21 HDLC signal sent from the transmitter to the receiver involving a multipage MPS signal which is labeled OK and maybe colored green. Event 60 is a repeat of the V.21 HDLC of event 50. Event 60 is labeled a command repeat CMD REPEAT which occurred because the transmitter did not receive a response to the multipage signal of event 55. Command repeats such as event 60 are considered marginal events and may be colored yellow. Event 69 is a retrain negative signal which is sent by the receiver to the transmitter. The display identifies the cause of the retrain negative signal as being a bad page and event 69 accordingly may be colored red. Event 74 is a V.21 HDLC signal involving a digital command signal DCS in which the transmitter notifies the receiver that it will fall back to a V.27ter 4800 bps rate. The diagnostics identifies event 74 as being caused by a request to retrain. Event 75 is a V.27ter 4800 bps training sequence TCF sent from the transmitter to the receiver. ISQM measurements have indicated that this trial transmission was marginal due to signal-to-noise considerations. Accordingly, event 75 may be colored yellow. Event 81 is a V.21 HDLC signal from the receiver to the transmitter confirming the receipt of the training sequence. The diagnostics have labeled event 81 OK. Event 81 accordingly may be colored green. Event 83 is a V.27ter 4800 bps page transmission which has been identified as bad in light of ISQM measurements which indicate a signal-to-noise ratio which is too low. Event 84 is a V.21 HDLC sequence identifying the end of procedure EOP which was OK and accordingly, may be colored green. Event 100 is a V.21 HDLC signal from the transmitter to the receiver repeating the transmission of the EOP signal of event 84. As in the case of event 60, this is a command repeat CMD REPEAT which is considered marginal and may be colored yellow. The receiver next confirmed the receipt of the EOP signal in event 104. Event 104 was OK and may be colored green. Event 108 is a proper V.21 HDLC disconnect DCN signal which was OK and may be colored green.

A user of a facsimile measurement apparatus in accordance with the invention may call up a display of individual analog ISQM measurements made by the apparatus for each event in the calls which have been monitored for which ISQM has been made. FIG. 24 is a display corresponding to the event 50 of the call shown in FIG. 23. FIG. 24 shows the level of amplitude and phase jitter, the level of amplitude and phase modulation, the level of attenuation distortion at a number of different frequencies from about 604 Hz to about 2804 Hz, and the envelope delay distortion at the same frequencies. FIG. 24 also reports various other measurements in the right-hand column which are self-explanatory. FIG. 24 also shows an expanded diagnostic message identifying a problem with the subject transmission. In this example, all of the measurements were OK with the exception of bad measurements for the two signal-to-noise ratios S/N 0 and S/N 1 and the IMP 2 measurement.

Figure 25:
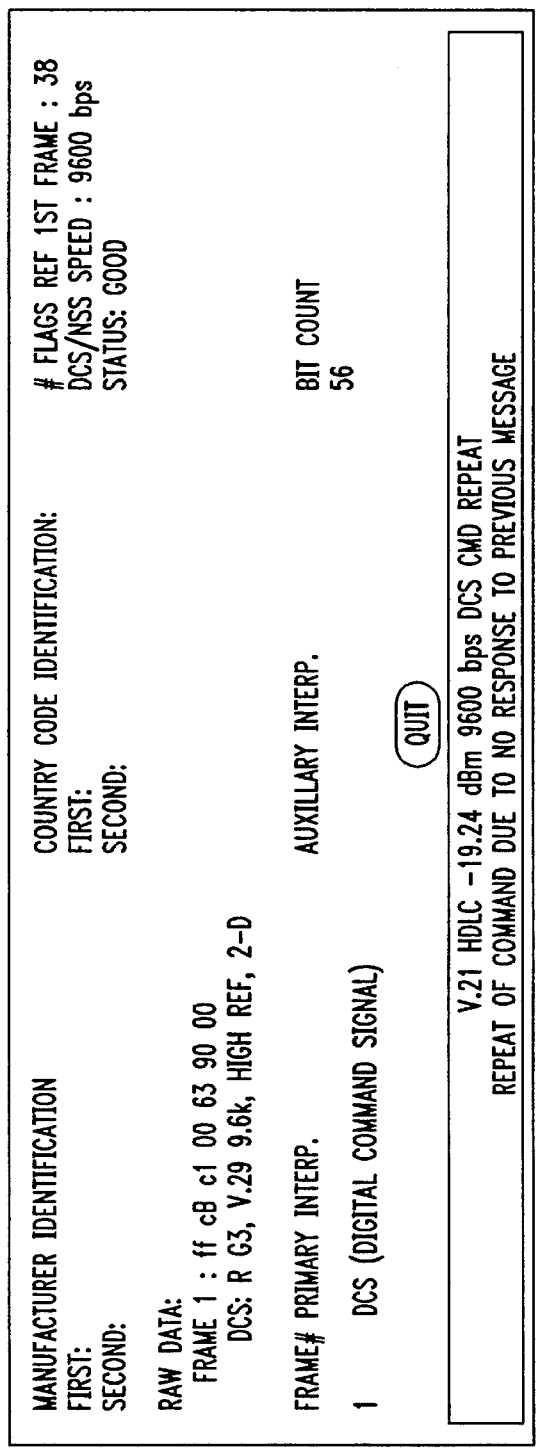
FIG. 25 is an example of raw data taken for one of the events shown in FIG. 23.

A user of a facsimile measurement apparatus in accordance with this invention may also display information about the actual bits which are in the protocol messages found in facsimile transmissions. FIG. 25 shows such a display for event 32 in FIG. 23. FIG. 25 also shows an expanded diagnostic message which explains the command repeat designation shown in FIG. 23.

We claim:

1. An apparatus for monitoring facsimile transmissions as they occur in real time, comprising:

means responsive to some or all communications traffic on selected trunks of a central office switching system for identifying facsimile transmissions on the selected trunks;

means for non-intrusively measuring selected parameters of the identified facsimile transmissions for determining impairments of the facsimile transmissions; and a user interface for communicating to a user impairments of the facsimile transmissions.

2. The apparatus of claim 1, in which the measuring means comprises a means for measuring protocol signals in the facsimile transmissions.

3. The apparatus of claim 1, in which the measuring means comprises a means for measuring page signals in the facsimile transmissions.

4. The apparatus of claim 2, in which the measuring means further comprises a means for measuring page signals in the facsimile transmissions.

5. The apparatus of claim 1, in which the identifying means further comprises a means for automatically classifying signals appearing on the selected trunks.

6. The apparatus of claim 1, in which the measuring means comprises a means for detecting echo signals on the selected trunks.

7. The apparatus of claim 1, in which the measuring means comprises:

a means for classifying signals on the selected trunks;

a means for measuring transmission impairments related to the signals on the selected trunks;

a means for detecting echo signals on the selected trunks; and a means for interpreting protocol messages on the selected trunks.

8. The apparatus of claim 7, further comprising means for integrating signals from the classifying, measuring, detecting, and interpreting means into a data signal representing an event stream in a facsimile transmission.

9. The apparatus of claim 8, further comprising means responsive to the integrating means for analyzing facsimile transmissions appearing on the selected trunks and diagnosing those facsimile transmissions.

10. The apparatus of claim 1, in which the measuring means comprises a means responsive to signaling in the central office switching system for identifying the boundaries of calls on the selected trunks.

11. The apparatus of claim 1, in which the measuring means comprises a means for performing coarse voice band signal classification.

12. The apparatus of claim 1, in which the measuring means comprises:
   a means for performing speed classification of signals appearing on the selected trunks; and
   a means responsive to the speed signal classification means for identifying at least one characteristic of one or more modems involved in facsimile transmissions on the selected trunks.

13. The apparatus of claim 1, in which the measuring means comprises a means for detecting predetermined tones in facsimile transmissions on the selected trunks.

14. The apparatus of claim 13, in which the tone detecting means detects training tones in the facsimile transmissions.

15. The apparatus of claim 12, further comprising a tone detecting means detects modem training tones in the facsimile transmissions.

16. The apparatus of claim 15, further comprising a modem identifying means is responsive to the speed signal classification means and is responsive to the tone detecting means to identify at least one characteristic of one or more modems involved in the facsimile transmissions on the selected trunks.

17. The apparatus of claim 1, in which the measuring means comprises a means for demodulating protocol signals in facsimile transmissions on the selected trunks.

18. The apparatus of claim 17, in which the demodulating means distinguishes between primary and echo signals related to the protocol signals.

19. The apparatus of claim 12, in which the measuring means comprises a means for demodulating protocol signals in facsimile transmissions on the selected trunks.

20. The apparatus of claim 19, in which the measuring means comprises a means for performing protocol tracking in response to the demodulated protocol signals; and
   a means responsive to signals from the modem identification means and the coarse protocol tracking means for producing in-service quality measurement control signals:

21. The apparatus of claim 19, in which the measuring means further comprises a means responsive to page signals in the facsimile transmissions on the selected trunks and to the in-service quality measurement control signals for performing predetermined in-service quality measurements.

22. The apparatus of claim 1, in which the measuring means collects statistics relating to facsimile transmissions on selected trunks of the central office switching system.

23. The apparatus of claim 22, in which the measuring means collects statistics relating to facsimile transmissions directed to a predetermined geographical area.

24. The apparatus of claim 22, in which the measuring means collects statistics relating to facsimile transmissions on predetermined groups of trunks connected to the central office switching system.

25. The apparatus of claim 22, in which the measuring means collects statistics related to the volume of facsimile transmissions on one or more predetermined trunks connected to the central office switching system.

26. The apparatus of claim 25, in which the measuring means collects statistics identifying the volume of predetermined kinds of facsimile transmissions on one or more predetermined trunks connected to the central office switching system.

27. The apparatus of claim 26, in which the measuring means collects statistics relating to the number of facsimile transmissions on one or more predetermined trunks which are completed at certain speeds.

28. The apparatus of claim 22, in which the user interface displays selected statistics related to facsimile transmissions on selected ones of the trunks connected to the central office switching system.

29. The apparatus of claim 1, in which the measuring means comprises a means for measuring trial transmissions in the facsimile transmissions.

30. The apparatus of claim 1, further comprising a tone detecting means for detecting modem training sequences in the facsimile transmissions.

31. The apparatus of claim 29, in which the measuring means further comprises a means responsive to trial transmissions in the facsimile transmissions on the selected trunks and to in-service quality measurement control signals for performing predetermined in-service quality measurements.

32. An apparatus for non-intrusively monitoring facsimile transmissions as they occur in real time, comprising:
   a means responsive to communications traffic on selected inbound and outbound trunks of a central office switching system for identifying facsimile transmissions on the selected trunks;
   a means for non-intrusively measuring selected parameters of the identified facsimile transmissions for determining selected characteristics of the facsimile transmissions; and
   a user interface for communicating to a user any of the selected characteristics of the facsimile transmissions.

33. A public switched telephone network for carrying communications traffic between subscribers to the network, comprising:
   at least one network node through which at least a portion of the communications traffic in the network flows;
   a means for nonintrusively monitoring facsimile transmissions in the communications traffic through the network node in real time; and
   an access control unit connected between the monitoring means and the network node which selectively makes available to the measuring means a predetermined portion of the communications traffic through the network node.

34. The public switched telephone network of claim 33, in which the access control unit connects to the monitoring means data relating to transmissions from a sending facsimile machine to a receiving facsimile machine and data relating to transmissions-from the receiving facsimile machine to the transmitting facsimile machine.

35. The public switched telephone network of claim 34, in which the monitoring means comprises a means for detecting protocol transmissions from the transmitting facsimile machine to the receiving facsimile machine and protocol transmissions from the receiving facsimile machine to the transmitting facsimile machine for ascertaining predetermined characteristics of the facsimile transmissions.

36. The public switched telephone network of claim 35, in which the monitoring means comprises a means responsive to the means for detecting protocol transmissions for making predetermined analog impairment measurements of page signals in the facsimile transmissions.

37. An apparatus for nonintrusively monitoring facsimile transmissions, comprising:

a means for detecting protocol transmissions from a transmitting facsimile machine to a receiving facsimile machine and protocol transmissions from the receiving facsimile machine to the transmitting facsimile machine; and a means responsive to the detecting means for nonintrusive impairment measurements of page signals in the facsimile transmissions.

38. The apparatus of claim 37, in which the page signals comprise trial transmissions sent by the transmitting facsimile machine to the receiving facsimile machine.

39. A telecommunications network, comprising:

a node for receiving communications traffic comprising facsimile transmissions and non-facsimile transmissions on a plurality of input trunks and for delivering the communications traffic to selected ones of a plurality of output trunks;

a means responsive to the communications traffic for detecting facsimile protocol signals as they occur in real time thereby distinguishing the facsimile transmissions from the non-facsimile transmissions in the communications traffic; and a means responsive to the detection of facsimile protocol signals for making impairment measurements of the protocol signals and data signals associated with a facsimile transmission.

40. The telecommunications network of claim 39, further comprising:

a means for providing access to selected portions of the communications traffic for identification of facsimile transmissions in those selected portions of the traffic and for measurement of impairments in those facsimile transmissions.

41. The telecommunications network of claim 39, in which the means for making impairment measurements makes impairment measurements on page signals in a facsimile transmission in response to detection of protocol signals associated with that facsimile transmission.

42. An apparatus for monitoring facsimile transmissions as they occur in real time, comprising:

a means responsive to communications traffic flowing through a node of a telecommunications network for identifying facsimile transmissions;

a means for ascertaining a predetermined characteristic of a protocol signal in the facsimile transmission; and a means responsive to the predetermined characteristic of the protocol signal for determining an impairment of the facsimile transmission.

43. The apparatus of claim 42, in which the means for measuring includes a means for demodulating the protocol signal in the facsimile transmission.

44. The apparatus of claim 43, in which the means for demodulating includes a means for interpreting a message in the protocol signal.

45. The apparatus of claim 43, in which the means for demodulating includes a means for producing an output signal relating to a characteristic of a page signal.

46. The apparatus of claim 43, in which the means for demodulating includes a means for producing an output signal relating to a characteristic of a trial transmission.

47. The apparatus of claim 42, in which the predetermined characteristic is an indication of a speed at which transmitting facsimile equipment sends information to receiving facsimile equipment.

48. The apparatus of claim 47, in which the predetermined characteristic is an indication of a speed at which transmitting facsimile equipment sends page data to receiving facsimile equipment.

49. The apparatus of claim 42, in which the predetermined characteristic is an indication of a characteristic of a modem used by transmitting facsimile equipment to send information to receiving facsimile equipment.

50. The apparatus of claim 49, in which the predetermined characteristic is an indication of a characteristic of a modem used by transmitting facsimile equipment to send page data to receiving facsimile equipment.

* * * * *